United States Patent
Coskun et al.

(10) Patent No.: US 12,389,076 B2
(45) Date of Patent: Aug. 12, 2025

(54) SYSTEMS AND METHODS FOR PROVIDING SUPPLEMENTAL CONTENT RELATED TO A QUERIED OBJECT

(71) Applicant: Adeia Guides Inc., San Jose, CA (US)

(72) Inventors: Mustafa Coskun, Kayseri (TR); Vehbi Cagri Gungor, Kayseri (TR); Dhananjay Lal, Englewood, CO (US); Reda Harb, Issaquah, WA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/141,059

(22) Filed: Apr. 28, 2023

(65) Prior Publication Data

US 2024/0364970 A1    Oct. 31, 2024

(51) Int. Cl.
*H04N 21/4722*    (2011.01)
*H04N 21/44*    (2011.01)
*H04N 21/45*    (2011.01)
*H04N 21/81*    (2011.01)

(52) U.S. Cl.
CPC ... *H04N 21/4722* (2013.01); *H04N 21/44008* (2013.01); *H04N 21/4532* (2013.01); *H04N 21/8133* (2013.01)

(58) Field of Classification Search
CPC ......... H04N 21/4722; H04N 21/44008; H04N 21/4532; H04N 21/8133; G06F 16/745; G06F 16/748
USPC .......................................................... 725/38
See application file for complete search history.

(56) References Cited

U.S. PATENT DOCUMENTS

| | | |
|---|---|---|
| 10,628,501 B2 | 4/2020 | Santiago |
| 10,681,432 B2 | 6/2020 | Vehovsky et al. |
| 10,869,094 B2 | 12/2020 | Stathacopoulos |
| 11,010,436 B1 | 5/2021 | Peng et al. |
| 11,170,817 B2 | 11/2021 | Pham et al. |
| 2005/0137958 A1* | 6/2005 | Huber ............ G06Q 30/02 705/37 |
| 2014/0331264 A1 | 11/2014 | Schneiderman et al. |
| 2016/0381434 A1* | 12/2016 | Pulido ............ H04N 21/23418 725/19 |
| 2020/0128294 A1 | 4/2020 | Gupta et al. |
| 2021/0321166 A1* | 10/2021 | Jeong ............ H04N 21/44008 |
| 2021/0360331 A1 | 11/2021 | Craner |

OTHER PUBLICATIONS

"LucidVideo—Create & Share Short Videos—Fast & Free", retrieved at https://web.archive.org/web/20220616125437/https:/lucidvideo.ai/, on Jul. 11, 2023.

(Continued)

*Primary Examiner* — Adil Ocak
(74) *Attorney, Agent, or Firm* — Haley Guiliano LLP

(57) ABSTRACT

Systems and methods are described for generating for display a media asset, and receiving a query regarding an object depicted in the media asset at a first time point within a presentation duration of the media asset. The system and methods may, based on receiving the query, determine one or more second presentation points within the presentation duration of the media asset related to the object, identify the one or more second presentation points as supplemental content, and generate for display the supplemental content while the media asset is being generated for display.

20 Claims, 22 Drawing Sheets

(56) References Cited

OTHER PUBLICATIONS

Almog, Uri, "Object Detection With Deep Learning: RCNN, Anchors, Non-Maximum-Suppression", https://medium.com/swlh/object-detection-with-deep-learning-rcnn-anchors-non-maximum-suppression-ce5a83c7c62b, Oct. 3, 2020.

Anwar, Taha, "Introduction to Video Classification and Human Activity Recognition", https://learnopencv.com/introduction-to-video-classification-and-human-activity-recognition/, Mar. 8, 2021.

Bastani, Favyen, et al., "MIRIS: Fast Object Track Queries in Video", In Proceedings of the 2020 ACM SIGMOD International Conference on Management of Data, 2020, 1907-1921.

Coimbra De Andrade, Douglas, "Recognizing Speech Commands Using Recurrent Neural Networks with Attention", https://towardsdatascience.com/recognizing-speech-commands-using-recurrent-neural-networks-with-attention-c2b2ba17c837, Dec. 27, 2018.

Golub, Gene H., et al., "Tikhonov regularization and total least squares", Siam J. Matrix Anal. Appl., vol. 21, No. 1, 1999, 185-194.

Gunjal, Satish, "Multivariate Linear Regression From Scratch With Python", retrieved at https://web.archive.org/web/20210616210641/https:/satishgunjal.com/multivariate_lr/#page-title, on Jul. 11, 2023.

He, Kaiming, et al., "Mask R-CNN", In Proceedings of the IEEE International Conference on Computer Vision, 2017, 2961-2969.

Hossain, Md Zakir, et al., "A comprehensive survey of deep learning for image captioning", ACM Computing Surveys (CsUR) 51, No. 6, 2018, 1-36.

Karpathy, Andrej, et al., "Deep visual-semantic alignments for generating image descriptions", In Proceedings of the IEEE Conference on Computer Vision and Pattern Recognition, 2015, 3128-3137.

Khattak, Asad, et al., "An efficient deep learning technique for facial emotion recognition", Multimedia Tools and Applications 81, No. 2, 2022, 1649-1683.

Liu, Wei, et al., "SSD: Single Shot MultiBox Detector", In European Conference on Computer Vision (ECCV) 2016, Springer, Part I, LNCS 9905, 2016, 21-37.

Lokoč, Jakub, et al., "A Framework for Effective Known-item Search in Video", In Proceedings of the 27th ACM International Conference on Multimedia, 2019, 1777-1785.

Rao, Anyi, et al., "A Local-to-Global Approach to Multi-modal Movie Scene Segmentation", In Proceedings of the IEEE/CVF Conference on Computer Vision and Pattern Recognition, 2020, 10146-10155.

Redmon, Joseph, et al., "YOLOv3: An Incremental Improvement", Technical Report, University of Washington, 2018, 1-6.

Rendle, Steffen, et al., "BPR: Bayesian Personalized Ranking from Implicit Feedback", UAI 2009, https://arxiv.org/ftp/arxiv/papers/1205/1205.2618.pdf, 2009, 452-461.

Rui, Yong, et al., "Exploring Video Structure Beyond the Shots", In Proceedings. IEEE International Conference on Multimedia Computing and Systems (Cat. No. 98TB100241), 1998, 237-240.

Shetty, Badreesh, "5 Classification Algorithms for Machine Learning", https://builtin.com/data-science/supervised-machine-learning-classification, Apr. 23, 2023.

Theckedath, Dhananjay, et al., "Detecting Afect States Using VGG16, ResNet50 and SE-ResNet50 Networks", SN Computer Science 1:79, 2020, 1-7.

Wang, Limin, et al., "Temporal Segment Networks: Towards Good Practices for Deep Action Recognition", European Conference on Computer Vision (ECCV), 2016, 1-16.

Zhang, Muhan, et al., "Link Prediction Based on Graph Neural Networks", 32nd Conference on Neural Information Processing Systems (NeurIPS 2018), 2018, 1-11.

\* cited by examiner

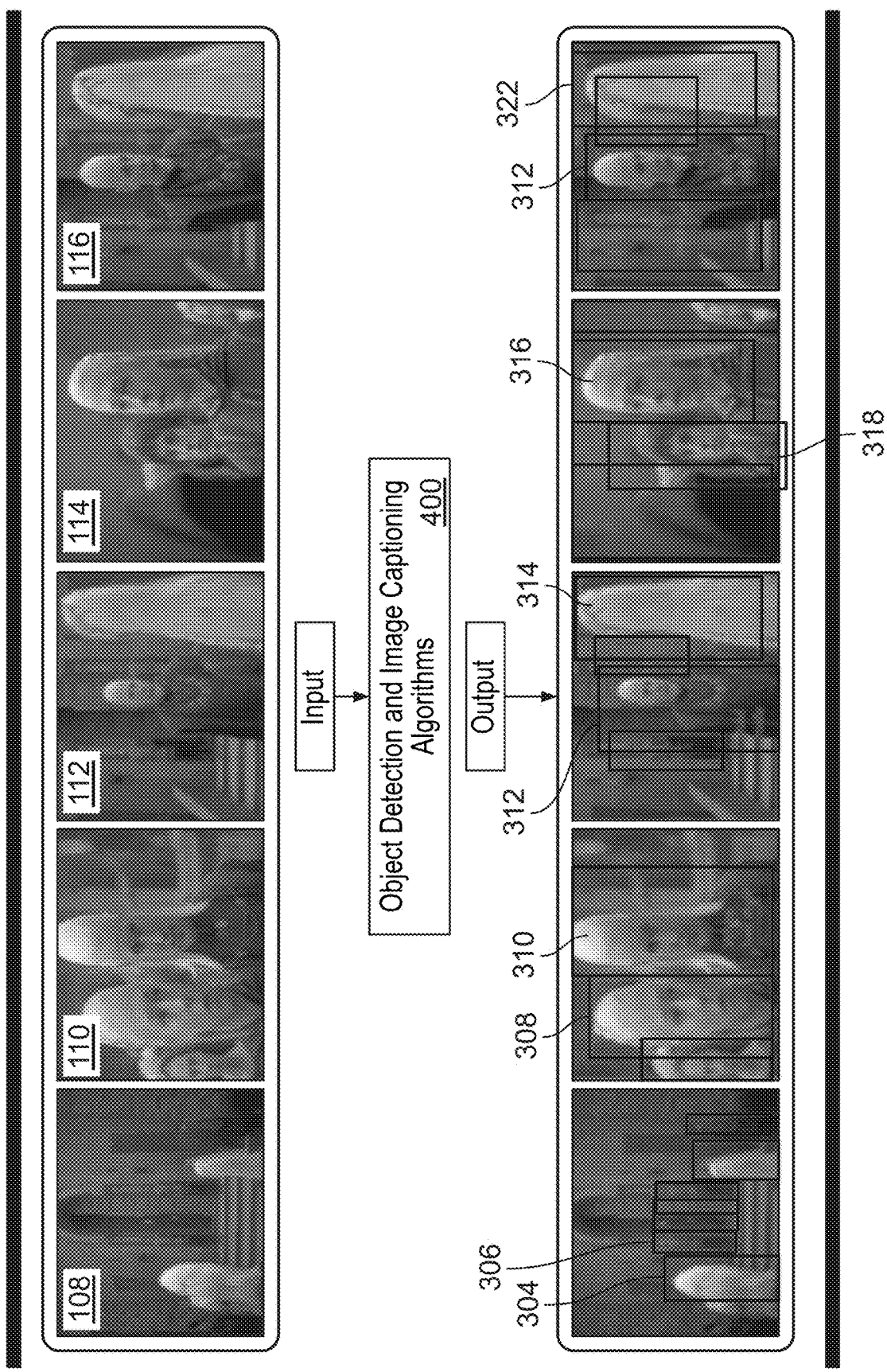

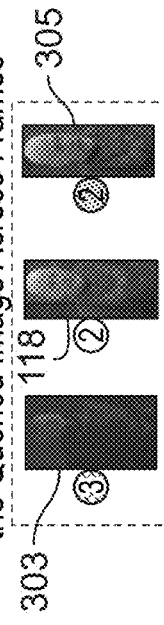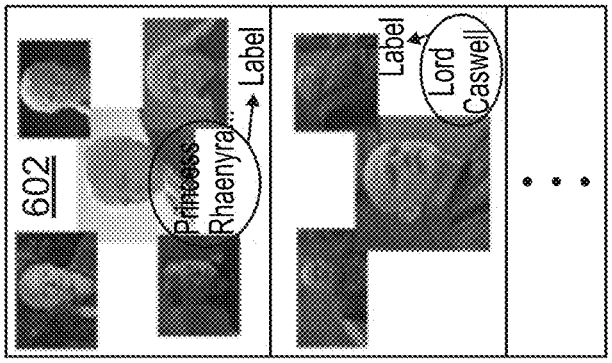
FIG. 6

SYSTEMS AND METHODS FOR PROVIDING SUPPLEMENTAL CONTENT RELATED TO A QUERIED OBJECT

BACKGROUND

This disclosure is directed to systems and methods for generating for display supplemental content. In particular, techniques are disclosed for, based on receiving a query regarding an object depicted at a first time point in a media asset being generated for display, determining as the supplemental content one or more second presentation points, from within the presentation duration of the media asset, that are related to the object.

SUMMARY

Modern media creation and distribution systems enable a user to access more media content than ever before, and on more devices than ever before. Many media assets, such as, for example, media assets in the science fiction genre, depict various objects (e.g., actors, characters, real or fantasy locations or places, animals, items, etc.) across multiple episodes or movies, and there may be complex relationships among such objects in the context of the media asset's intricate plot. Users often may be confused about which character is being shown in a particular scene, or what a particular object is in a particular scene. In an effort to determine such information, users may rewatch the media asset at a later date, rewind the media asset, switch to viewing a previous media asset related to the current media asset, seek out answers from explanatory videos or articles at third-party sources, or ask other users in the room about a particular object, all of which may be time-consuming and/or distract from the user's (and potentially other user's) current viewing experience. Some users may simply continue watching the current content with a limited understanding of its complex plot and characters, which leads to a subpar entertainment experience.

Many content providers desire to provide supplemental content with requested media content, such as to provide a user with additional information and/or opportunities for further interaction with content. In one approach, content providers enable viewers to view static or pre-generated data about a scene, such as a name of an actor in the scene. While this may be useful, a particular user might be interested in an object that is not included in such pre-generated data, and such user may not able to find out more information about such object. In addition, if such information is provided for every single scene throughout the playing of the media asset (including scenes for which the user is not interested in seeing such information), the content provider may expend computing and networking resources to generate and transmit the information without any benefit to the content provider or the user. Moreover, in such approach, each user is provided with the same options to view the same information (i.e., the name of an actor in a scene), without being tailored or personalized to the interests of the particular user viewing the content.

To help overcome these problems, systems, apparatuses and methods are disclosed herein for generating for display a media asset and receiving a query regarding an object depicted in the media asset at a first time point within a presentation duration of the media asset. The systems, apparatuses and methods provided for herein may further comprise determining, based on receiving the query, one or more second presentation points within the presentation duration of the media asset related to the object and identifying the one or more second presentation points as supplemental content. Such supplemental content may be generated for display while the media asset is being generated for display.

Such aspects may enable any suitable object in a portion of a media asset being provided to a user to be queried by the user, and providing relevant supplemental content related to the object associated with the query, to help improve a user's understanding and comprehension of the queried object in the context of the media asset. Such supplemental content may include countless characters objects and characters across multiple different episodes and seasons, or across multiple other related media assets. For example, if season 1, episode 3 of the series "Game of Thrones," is being streamed by or otherwise provided to a user, and input is received to query an object depicted in such episode at a particular presentation point within the episode, the systems, apparatuses and methods provided for herein may identify as relevant supplemental content a more clear depiction and/or description of such object from a presentation point that is earlier (or later) within such episode. Additionally or alternatively, the systems, apparatuses and methods provided for herein may identify as supplemental content (e.g., video scene segmentation) a presentation point from an earlier (or later) episode within the same season or different season of "Game of Thrones," or in another related media asset (e.g., an episode of "House of the Dragon" which is a prequel of "Game of Thrones").

The systems, apparatuses and methods disclosed herein may conserve computing and/or network resources by providing such supplemental content only for an object in a scene that a user specifically is interested in, rather than providing supplemental information for actors in every single scene provided to a user, and/or may enable a user to query any desired object in a scene, rather than providing information on only a preset character (e.g., one of the actors in the scene). Moreover, the systems, apparatuses and methods disclosed herein may provide personalized supplemental content based on the metadata of the scenes that contain the object and user's profile/interests (e.g., user's metadata), where the user's interests may be inferred from their prior actions and past behavior.

In some embodiments, the systems, apparatuses and methods disclosed herein may be further configured to determine an identity of the object in a context of the media asset by identifying a plurality of portions of the media asset that are related to the object depicted at the first time point of the media asset and associated with the query, and using one or more attributes of the plurality of portions of the media asset to determine the identity of the object in the context of the media asset. In some embodiments, such one or more attributes may correspond to one or more images of the object (e.g., from a different perspective and/or in a different scene than a scene corresponding to when the object was queried), subtitles related to the object, closed captions related to the object, audio related to the object, or any other suitable metadata related to the object, or any combination thereof.

In some embodiments, determining the identity of the object in a context of the media asset further comprises determining a type of the object depicted at the first time point of the media asset and associated with the query, wherein the plurality of portions of the media asset that are related to the object are identified based on depicting one or more objects of the same type as the object. In some embodiments, determining the identity of the object in a context of the media asset further comprises comparing the object associated with the query to the one or more objects depicted in the plurality of portions of the media asset; determining, based on the comparing, one or more matching objects in the plurality of portions that match the object depicted at the first time point of the media asset and associated with the query; and using the one or more matching objects to determine the identity of the object in the context of the media asset.

In some embodiments, the systems, apparatuses and methods disclosed herein may be further configured to train a machine learning model to receive as input an attribute related to a particular object depicted in the media asset and output an indication of an identity of the particular object in the context of the media asset. A particular attribute related to the object and one or more attributes related to the plurality of portions of the media asset may be input to the trained machine learning model, where the one or more attributes may be different than the particular attribute of the object. The systems, apparatuses and methods disclosed herein may be further configured to determine that an output of the trained machine learning model indicates the identity of the object in the context of the media asset.

In some embodiments, the systems, apparatuses and methods disclosed herein may be further configured to generate a knowledge graph comprising a plurality of nodes, the plurality of nodes comprising a first node corresponding to a particular attribute related to the object and one or more other nodes corresponding to one or more attributes related to the plurality of portions of the media asset, and use the knowledge graph to determine the identity of the object in the context of the media asset.

In some embodiments, the systems, apparatuses and methods disclosed herein may be further configured to input, to the trained machine learning model, a particular representation of the object and one or more representations of the one or more matching objects, wherein the one or more representations of the matching objects each correspond to a different representation of the object than the particular representation of the object; and determine that an output of the trained machine learning model indicates the identity of the object in the context of the media asset.

In some embodiments, the systems, apparatuses and methods disclosed herein may be further configured to generate a knowledge graph comprising a plurality of nodes, the plurality of nodes comprising a first node corresponding to the object and one or more other nodes corresponding to the one or more objects; and use the knowledge graph to determine the identity of the object in the context of the media asset.

In some embodiments, the media asset is an episodic media asset comprising a plurality of episodes of a series; the first time point occurs during a first episode of the plurality of episodes; and the one or more second presentation points occur during one or more second episodes of the plurality of episodes that are earlier in the series than the first episode or later in the series than the first episode.

In some embodiments, the media asset is an episodic media asset comprising a plurality of episodes of a series; the first time point occurs during a first episode of the plurality of episodes; and the one or more second presentation points occur during one or more second episodes of the plurality of episodes that are later in the series than the first episode.

In some embodiments, the media asset comprises a plurality of related media assets; the first time point occurs during a first related media asset of the plurality of related media assets; and the one or more second presentation points occur during a second related media asset corresponding to a prequel of, or a sequel to, the first related media asset.

In some embodiments, the systems, apparatuses and methods disclosed herein may be further configured to determine, based on a user profile of a user associated with the query, whether the one or more second presentation points were previously consumed by the user profile, and generate for display the supplemental content while the media asset is being generated for display is further based at least in part on determining that the one or more second presentation points were previously consumed by the user profile.

In some embodiments, the systems, apparatuses and methods disclosed herein may be further configured to determine, based on one or more interactions of the user profile with the one or more second presentation points, whether the one or more second presentation points were of interest to the user, and generate for display the supplemental content while the media asset is being generated for display is further based at least in part on determining that the one or more second presentation points were of interest to the user

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 4 shows an illustrative technique for generating bounding shapes, in accordance with some embodiments of the present disclosure.

FIG. 6 shows an illustrative technique for determining an identity of a selected object, in accordance with some embodiments of the present disclosure.

DETAILED DESCRIPTION

Figure 1:
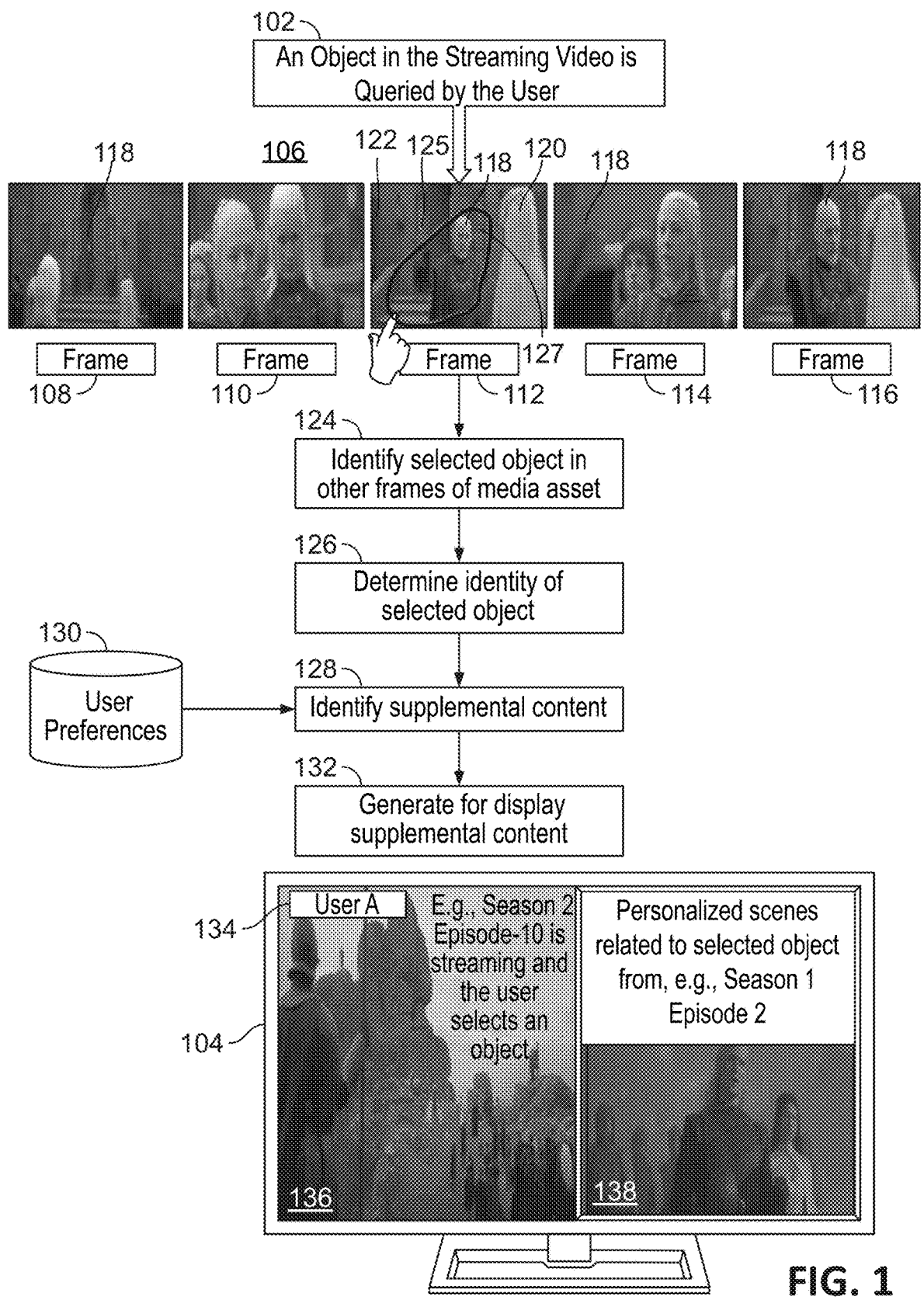
FIG. 1 shows an illustrative system for identifying and generating for display supplemental content, in accordance with some embodiments of this disclosure.

FIG. 1 shows an illustrative system for identifying and generating for display supplemental content, in accordance with some embodiments of this disclosure. A media application (e.g., executed at least in part on user equipment 104 and/or at one or more remote servers and/or at distributed across any of one or more other suitable computing devices) may generate for display media asset 106, e.g., in response to receiving a user request to view media asset 106. The media application may be configured to perform the functionalities described herein. In some embodiments, the image processing system may comprise or be incorporated as part of any suitable application, e.g., one or more media asset provider applications, extended reality (XR) applications, video or image or electronic communication applications, social networking applications, image or video capturing and/or editing applications, or any other suitable application(s).

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

In some embodiments, the media application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

Figure 18:
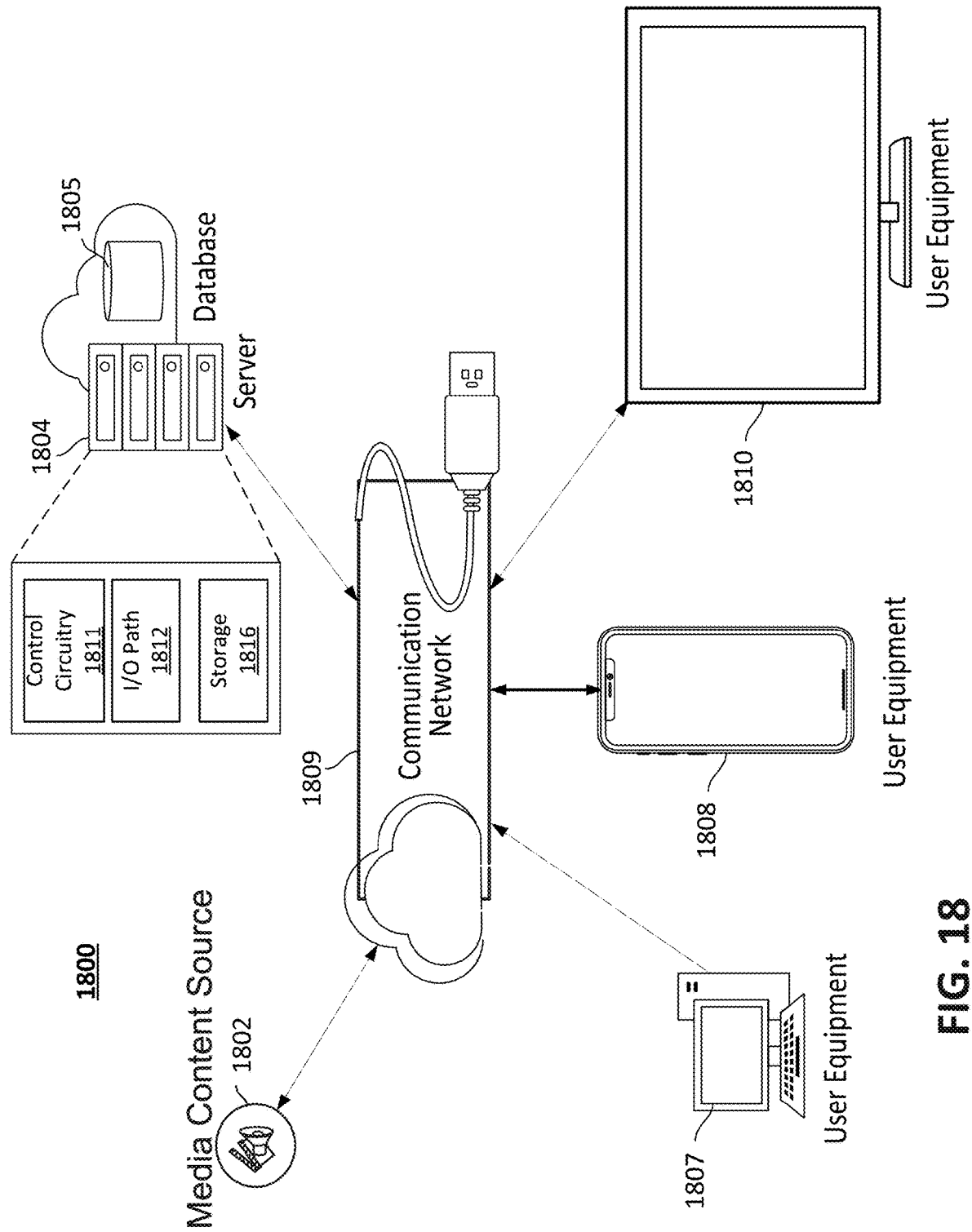

Media asset 106 may be generated for display from a broadcast or stream received at user equipment 104, or from a recording stored in a memory of user equipment 104 and/or a remote server (e.g., from media content source 1802 or server 1804 of FIG. 18). User equipment 104 may be any suitable device, e.g., a television, and/or may include an integrated display, e.g., on a smartphone or tablet, or may be connected to an external display device, e.g., a television. As referred to herein, the terms "media asset" and "content" may be understood to mean electronically consumable user assets, such as 3D content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by user equipment devices, and/or can be part of a live performance. In some embodiments, media asset 106 may correspond to any suitable e-Commerce content item, e.g., a digital image, video, textual and/or other suitable content item that is represents product or service that is available for purchase (or for rental) on an eCommerce or other Internet platform.

As shown in FIG. 1, media asset 106 may comprise a plurality of frames 108, 110, 112, 114 and 116, which may be consecutive or sequential frames, or any other suitable group of frames of media asset 106. In some embodiments, a plurality of the frames or other portions of media asset 106 may depict a variety of objects. For example, frame 112 may depict objects 118 (e.g., a first character played by actor in a cast of media asset 106), 120 (e.g., a second character played by actor in a cast of media asset 106), 122 (e.g., a building) 125 (e.g., a third character played by actor in a cast of media asset 106) and 127 (e.g., a fourth character played by actor in a cast of media asset 106). As referred to herein, the term "object" should be understood to refer to any person, structure, landmark, animal, item, location, place, or any portion or component thereof, or any other suitable observable entity or attribute thereof depicted visually in a media asset or otherwise output (e.g., audio) as part of the media asset. In some embodiments, an actor may visually and/or vocally portray a character in media asset 106.

As shown at 102 of FIG. 1, when generating for display frame or portion 112 of media asset 106, the media application may receive a query regarding an object (e.g., character 118) depicted in media asset 106 at a first time point within a presentation duration of the media asset. As a non-limiting example, media asset 106 may correspond to an episode (e.g., episode 4 out of 10) in a particular season (e.g., season 1) of the television series "House of the Dragon," and frame 112 may correspond to any suitable time point (e.g., a 10-minute time point or time mark in a one hour presentation duration). In some embodiments, media asset 106 may be understood to refer to an entire season, or multiple seasons, of episodic content or serial programming, or media asset 106 may be understood to refer to a single episode or program of such episodic content or serial programming, or any suitable number of episodes across one or more seasons. In some embodiments, media asset 106 may refer to a particular movie or event or other particular content item having a single part in isolation, or one or more content items of a multi-part content item (e.g., a trilogy of movies, a set of movies or other content having a sequel and a prequel, or any other suitable set of related content items).

The query received at 102 may be received in any suitable form, e.g., as voice input, tactile input, input received via a keyboard or remote, input received via a touchscreen, text-based input, biometric input, or any other suitable input, or any combination thereof. In some embodiments, the query may be received at 102 based on the media application detecting that a user is circling, pointing, touching or air-touching with a remote, and/or based on computer vision aided XR glasses, based on eye tracking in an XR headset and mapping the selected objects to spatial coordinates of the on-screen objects, or via any other suitable technique and/or device, or any combination thereof. In some embodiments, the query may be received at 102 based on user input corresponding to voice and/or hand gestures (and/or other suitable input) tracked by sensor(s) of user equipment device 104 and/or sensor(s) of any other suitable computing device. In some embodiments, a virtual window or other indicator may be placed around the selected object at user equipment 104. In some embodiments, the media application may determine that a query input has been received based on determining that an input (e.g., a touch input) has been received for at least a threshold duration (e.g., 3 consecutive seconds).

As a non-limiting example, the query received at 102 may correspond to a voice input of "Who is that character?" while frame 112 is being generated for display by the media application, or the query received at 102 may correspond to a user selecting or otherwise gesturing towards object 118 being displayed at user equipment 104. For example, such input query may enable a user to select a character or other object depicted on the screen while the media asset is being streamed or otherwise provided, e.g., over a series of consecutive (or otherwise closely spaced temporally) frames. Such input query may be received without stopping video or audio of media asset 106, or after a user pauses media asset 106, or such input may cause media asset 106 to be paused.

In some embodiments, the media application may receive the query 102 because the user is not able to recognize selected object 118 in the current scene and desires to be provided with an identification of and/or explanation of selected object 118. For example, the media application may endeavor to correctly identify the object selected by the user and its "exact" identity, e.g., a "name" of the object in the show, such as, for example, the actor or actress or other performer's name and/or name of the character being played by the actor or actress or other performer, or a name of an item (e.g., "the iron throne").

Figure 2:
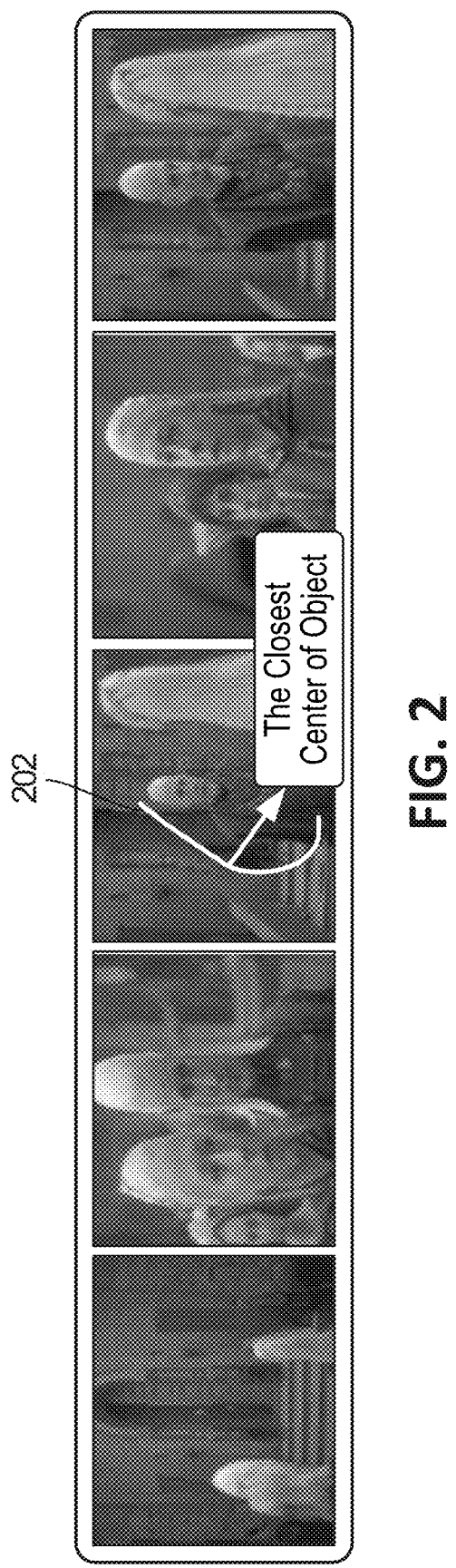
FIG. 2 shows an illustrative technique for determining a selected object, in accordance with some embodiments of this disclosure.

In some embodiments, as shown in FIG. 2, the media application may infer (e.g., based on receiving input 202) that the received user input intended to select an object, but did not adequately select it due to, e.g., a frame change that occurred when the input was received. In such a circumstance, the media application may utilize an edge detection technique, such as Tikhonov regularization, or any other suitable technique, or any combination thereof, to detect the closest center of the intended, but not properly selected, object, to determine the object the user intended to select.

As shown in FIG. 1, at 124, the media application may identify selected object 118 in other frames of media asset 106. For example, there may be images or depictions of the selected object 118 in prior or subsequent frames of media asset 106 in relation to current frame 112 having the selected object 118. Such other frames may comprise images of a higher resolution than frame 112, and/or may better match one or more images used in connection with a pretrained machine learning model (discussed in more detail below), or may otherwise depict object 118 in a clearer and/or more prominent and/or larger manner as compared to the depiction of object 118 in frame 112. In some embodiments, a clearer depiction of an object may correspond to a better compressed, and/or intra-coded object and/or frame depicting the object. In some embodiments, a clearer depiction of an object may correspond to a character's face being presented in a more distinguishable manner, e.g., object 118 in frame 108 or 112 may be less distinguishable as compared to object 118 in frame 116, and object 118 in frame 114 may be facing away from the camera and thus less distinguishable than in other frames.

In some embodiments, at 124, the media application may search for selected object 118 in consecutive frames of media asset 106 or any other suitable grouping of frames of media asset 106. For example, the media application may determine that frame 108 of FIG. 1 depicts a less clear depiction of object 118 than frame 112, which may be being generated for display when query 102 is received regarding object 118 in frame 112. The media application may additionally or alternatively determine that frame 116 of media asset 106 comprises a clearer depiction of object 118 than frame 112. In some embodiments, the media application may identify and search for each key frame of media asset 106 in which scene/image correlation is high in relation to frame 112, to find a clearer image of the selected object 118. In some embodiments, the media application may search through a predefined number of frames, e.g., 10 frames (or any other suitable number) before and/or after frame 112, for a clearer depiction of selected object 118. In some embodiments, the media application may search through one or more frames within a predefined time from frame 112, e.g., any frames within 10 minutes (or any suitable other number of minutes), or any frames appearing prior to or after frame 112 for one or more episodes, for a clearer depiction of selected object 118. In some embodiments, the media application may utilize the scene segmentation of frame 112 of selected object 118 or may utilize a threshold logic in which the media application scans frames until determining that a certain amount of certainty of the selected object's identity is met.

In some embodiments, the media application can search for the same object as selected object 118 across a predefined number of prior or subsequent frames, a series of frames, e.g., in FIG. 1 n frames before (e.g., 108 and 110) and/or n frames after (e.g., 114 and 116) from frame 112 having selected object 118. In some embodiments, the media application can consider whole scene segmentation to search for selected object 118 across frames.

Figure 3:
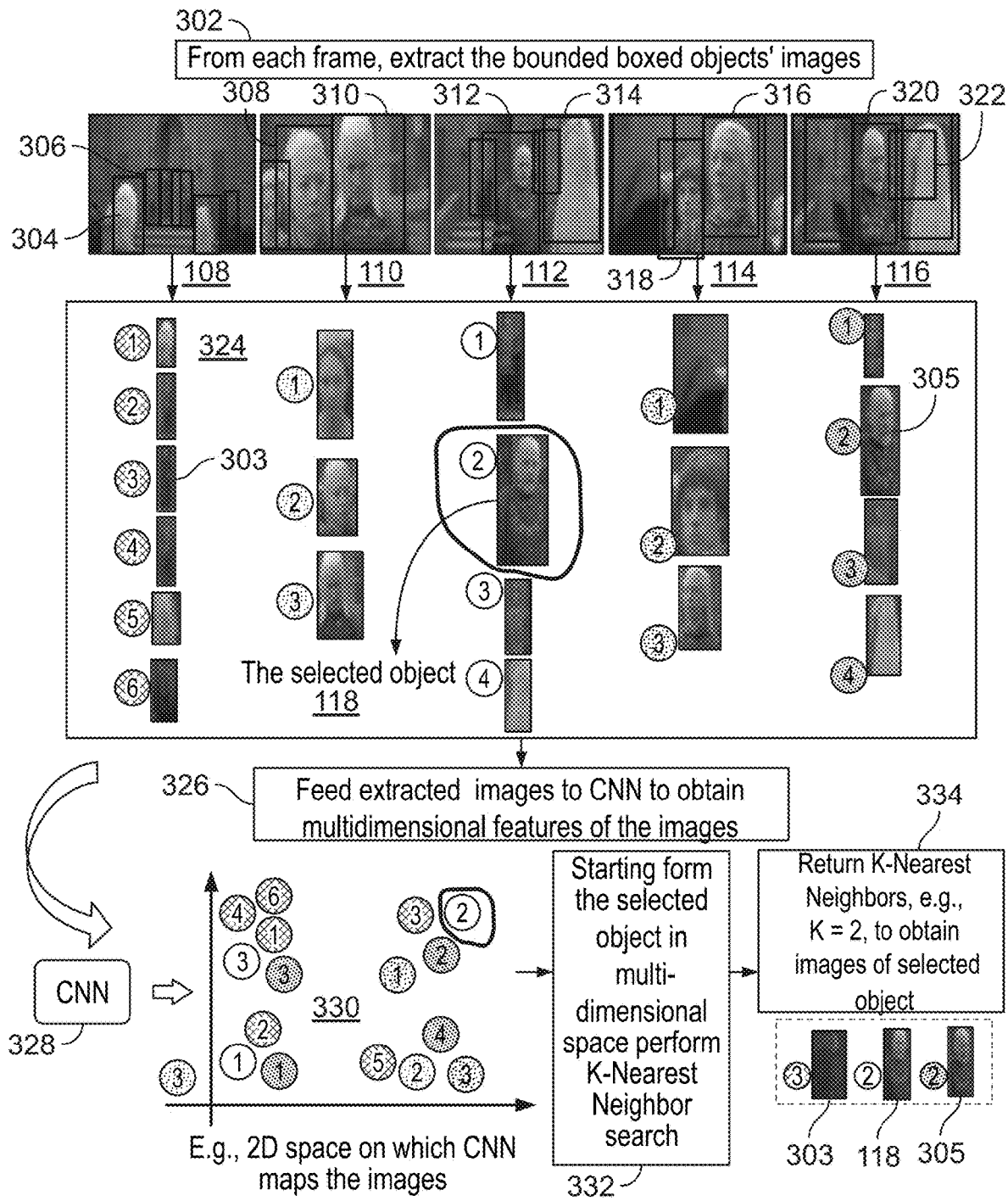
FIG. 3 shows an illustrative process 300 for identifying the selected object (and/or other data related to the selected object) in a plurality of portions of the media asset, in accordance with some embodiments of the present disclosure.

FIG. 3 shows an illustrative process 300 for identifying the selected object (and/or other data related to the selected object) in a plurality of portions of the media asset, in accordance with some embodiments of the present disclosure. In some embodiments, process 300 may be used to perform 124 of FIG. 1. While FIG. 3 describes identifying clearer depictions of the queried object across frames of media asset 106, it should be appreciated that any other suitable data related to the queried object may additionally or alternatively be identified across frames of media asset 106. For example, other objects (e.g., an object or location belonging to or otherwise associated with the queried object), a personality trait, subtitles, closed captions, audio (e.g., dialogue and/or music and/or any other suitable sound), other metadata, or any other suitable data, or any combination thereof, associated with the queried object may be identified. As shown in FIG. 3, at 302, the media application may generate a bounding shape or other bounding mechanism, and the bounding shape may surround a perimeter of and enclose a one or more objects of the image of the frame. For example, frame 108 may comprise bounding boxes such as 304, 306; frame 110 may comprise bounding boxes 308, 310; frame 112 may comprise bounding boxes, 312, 314; frame 112 may comprise bounding boxes 316, 318; and frame 116 may comprise bounding boxes 320, 322. The bounding shape may be any suitable shape (e.g., a circle, a box, a square, a rectangle, a polygon, an ellipse, or any other suitable shape, or any combination thereof). The bounding shape may be calculated in any suitable manner, and may be fitted to particular objects and/or portions of an image using any suitable technique. For example, the bounding shape may be drawn to surround the identified edges of an object, or identified edges of a particular portion or region of an image.

In some embodiments, as shown in FIG. 4, one or more object detection and/or image captioning techniques 400 may be used to generate the bounding shapes and/or to classify one or more objects in the frames. For example, the media application may utilize one or more machine learning models (e.g., a neural network, deep learning network, naive Bayes algorithm, logistic regression, recurrent neural network, convolutional neural network (CNN), bi-directional long short-term memory recurrent neural network model (LSTM-RNN), or any other suitable model, or any combination thereof) or any other suitable computer-implemented technique to generate bounding shapes around objects. For example, such machine learning model(s) may be trained with any suitable amount of training data to determine the boundaries of, and/or types of, objects in images input to the model. In some embodiments, such techniques may be used to classify regions of an image, and/or after the objects are detected (and bounding shapes are generated), model 328 may be used to classify an object into a certain type (e.g., a person, or a particular person, or a particular type of object, or any other suitable classification).

In some embodiments, respective bounding shapes may be generated for one or more objects surrounding selected object 118 across various frames. For example, where selected object 118 corresponds to a "Lord Caswell" character in media asset 106, the presence of another object (e.g., the character "Rheanyra" in such media asset 106 and shown in frames 110, 112 and 114 as surrounded by bounding shapes 308, 314 and 316, respectively) may be used to infer that selected object 118 indeed corresponds to "Lord Caswell" based at least in part on the common presence of an object (and/or similar type of object) of the character Rheanyra in proximity to object 118 across various frames. For example, the media application may determine that the character "Rheanyra" often appears close to or with the character "Lord Caswell" based no audio and/or visual analysis of frames and/or metadata of frames.

As shown at 324, the media application may extract, from each frame in which bounding shapes are generated, each image of an object (e.g., selected object 118 of FIG. 1 and FIG. 3) or portion of a frame corresponding to selected object 118, and/or those portions of frames being of the same type as the selected object. In some embodiments, objects may be extracted or segmented without the use of a bounding shape. For example, if selected object 118 is a person, the media application may extract, based on the generated bounding shapes, images within (or portions of) the frames that depict any person, across a series of consecutive frames or across any other suitable frames of media asset 106 of FIG. 1.

As shown at 326, the media application may feed each of the extracted images at 324 into a pre-trained machine learning model 328. In some embodiments, machine learning model 328 may utilize one or more machine learning models (e.g., a neural network, deep learning network, naive Bayes algorithm, logistic regression, recurrent neural network, convolutional neural network (CNN), bi-directional LSTM-RNN, or any other suitable model, or any combination thereof) or any other suitable computer-implemented technique, to localize and/or classify and/or perform image recognition on, objects in a given image or frame. For example, the machine learning model may output a value, a vector, a range of values, any suitable numeric representation of classifications of objects, or any combination thereof indicative of one or more predicted classifications and/or locations and/or associated confidence values, where the classifications may be any categories into which objects may be classified or characterized. In some embodiments, the model may be trained on a plurality of labeled image pairs, where images may be preprocessed and represented as feature vectors. For example, the training data may be labeled or annotated with indications of locations of multiple objects and/or indications of the type or class of each object.

As shown in FIG. 3, a CNN model may be employed as machine learning model 328, and the CNN may be pre-trained to map extracted images 324 into a two-dimensional (2D) vector space 330 (or any other suitable multi-dimensional space) such that visually similar images (and/or objects in such images) are mapped closer together at closer points within 2D space 330 as compared to less similar images. For example, model 328 may perform such mapping by learning patterns and distinctive or common features, such as, for example, object shape and/or size, common environments the object appears in, facial shape and/or size, facial features (e.g., distance between eyes, distance between nose and mouth or sizes thereof), body shape and/or size, style or color of clothes, or based on any other suitable features across the frames or images, or any combination thereof. In some embodiments, model 328 may comprise any suitable number of layers (e.g., 16), and the media application may cause a last layer (e.g., a prediction layer) to be removed to enable harvesting of a feature representation of each image in D=1,2,3, . . . dimensional space(s).

The multi-dimensional representations of images obtained using model 328 may correspond to an (x1, y1) coordinate point for the selected object in 2D space 330, and an embedding for such image may be obtained using any suitable dimensionality reduction technique, such as, for example, principal component analysis (PCA). After obtaining such multi-dimensional representations of images, the media application may search for K-nearest or closest neighbors points representing one or more images within the set of images. For example, the media application may compute a distance between the representative point, (x1,y1), corresponding to the selected object 118, and other representative point(s), (x2,y2), corresponding to another object in other frames as shown in equation (1) below:

$$d = \sqrt{|(x1-x2)^2 + (y1-y2)^2|}$$

In some embodiments, the media application may use, as a nearness or closeness value of two representative points, $e^{-(d/\sigma)}$, where a may be a hyper-parameter. The media application may return to the closest K (=2, 3, . . . ) points as the closest representative point(s), and may identify one or more images (at 334) corresponding to such point(s) as including or corresponding to an object matching selected object 118. For example, in FIG. 3, the media application may determine that image 303 from frame 108 and image 305 from frame 116 each include an object corresponding to selected object 118 of frame 112.

Figure 5A:
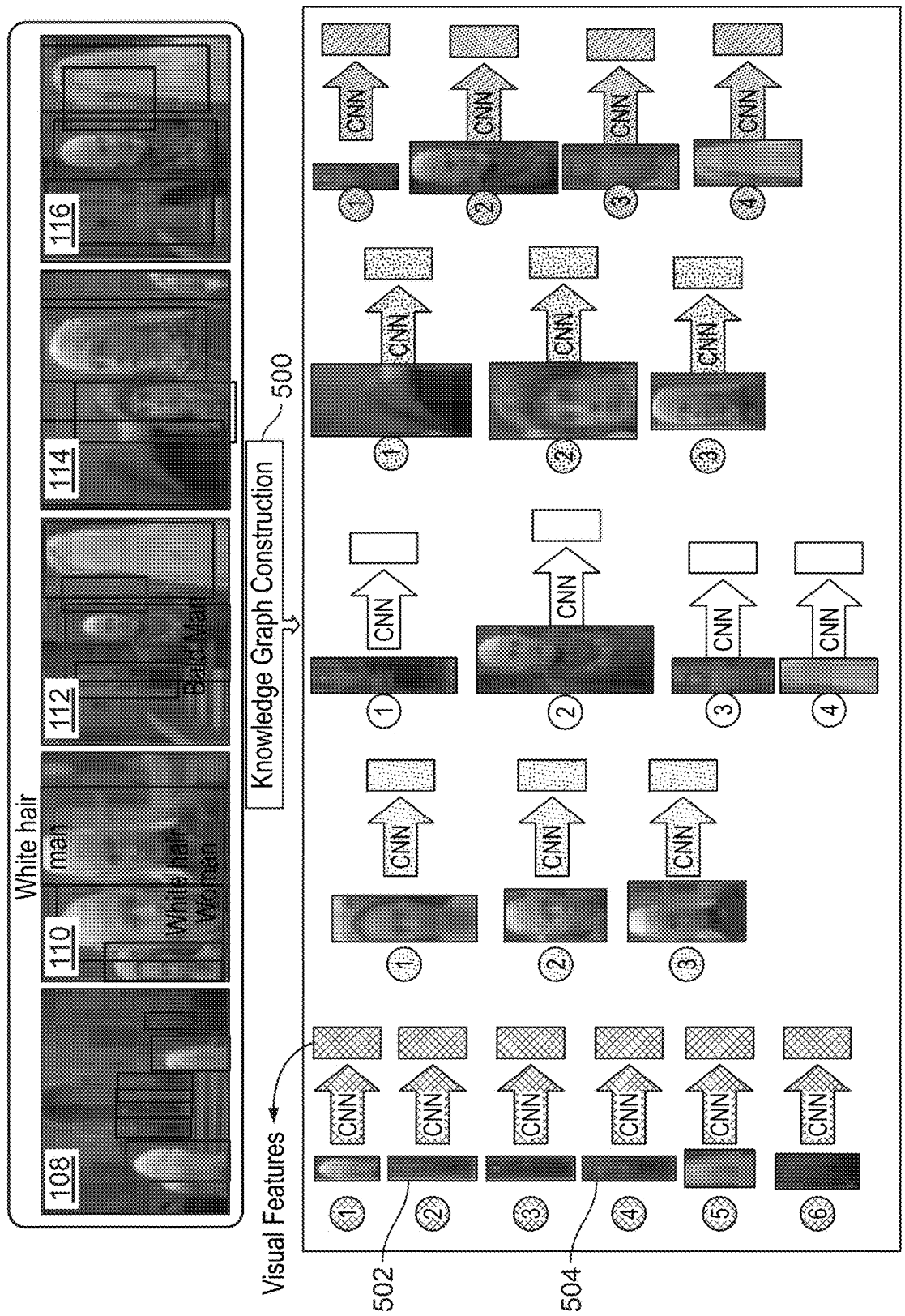
FIGS. 5A-5B show illustrative techniques for using a knowledge graph to identify a selected object in other portions of a media asset, in accordance with some embodiments of the present disclosure.

In some embodiments, as shown in FIG. 5A, the media application may generate and/or employ knowledge graph 500 to identify images across other frames that depict a selected object more clearly than in a frame in which the object is selected (e.g., object 118). For example, knowledge graph 500 may be used in conjunction with machine learning model 328 to assign each identified object, across the plurality of analyzed frames (e.g., 108, 110, 112, 114, 116) of media asset 106 of FIG. 1, a node of knowledge graph 500. In some embodiments, the media application may build connections among the identified objects. For example, connections in knowledge graph 500 may be built based at least in part on an object's location or depth within the frame, e.g., objects 502 and 504, corresponding to soldiers standing guard by an entrance way, may be connected in knowledge graph 500 because such soldiers are situated near each other (e.g., within a threshold distance from each other) in the frame, e.g., in this case objects 502 and 504 corresponding to the soldiers are side by side. Once knowledge graph 500 is generated, the media application may use any suitable computer-implemented technique (e.g., machine learning or other techniques) to traverse knowledge graph 500 to identify objects similar to selected object 118 of FIG. 1. Knowledge graphs are discussed in more detail in application Ser. No. 17/744,117, the contents of which is hereby incorporated by reference herein in its entirety.

In some embodiments, the media application may build knowledge graph 500 for each frame's (or other portion's) objects and object captions. In some embodiments, each frame of media asset 106 may be treated as a separate knowledge graph, e.g., in the example of FIG. 5A, five knowledge graphs may be generated based on five frames 108-116. Each object within a frame may be treated as "node" in the knowledge graph, e.g., frame 108 comprises six objects and thus a knowledge graph for frame 108 comprises six nodes; frame 110 comprises three objects and thus a knowledge graph for frame 110 comprises three nodes; frame 112 comprises four objects and thus a knowledge graph for frame 112 comprises four nodes; frame 114 comprises three objects and thus a knowledge graph for frame 114 comprises three nodes; and frame 116 comprises four objects and thus a knowledge graph for frame 116 comprises four nodes.

In some embodiments, each caption of the object (e.g., "bald male," "female," or "white hair") may be treated as an explanation or a description for a particular node. In some embodiments, a visual (image) of an object (to be represented by a node in a knowledge graph) may be fed into a machine learning model (e.g., a CNN model) to obtain a visual feature for the node, which may enable creation of a k dimensional feature vector for each node capable of being used for maximum matching of objects to determine the same object across frames. In one embodiment, audio associated with the object (e.g., voice of a person or other creature, or noises made by a dragon or other object, or theme music for a particular object) can be used as a distinguishing feature for a particular node). In some embodiments, the location or depth of an object in the frame can be used to create associations or edges amongst nodes. For example, frame 108 depicts two soldiers in a background while "white hair female" and "bald male" (corresponding to selected object 118 of FIG. 1) appear in a foreground, and thus nodes corresponding to the soldiers may be used to build an edge associating the soldiers, and nodes corresponding to the "white hair female" and the "bald male" may be used to build another edge associating the foreground characters. As shown at 500 of FIG. 5B, such techniques may be used by the media application to obtain an attributed knowledge graph for each frame.

Figure 5B:
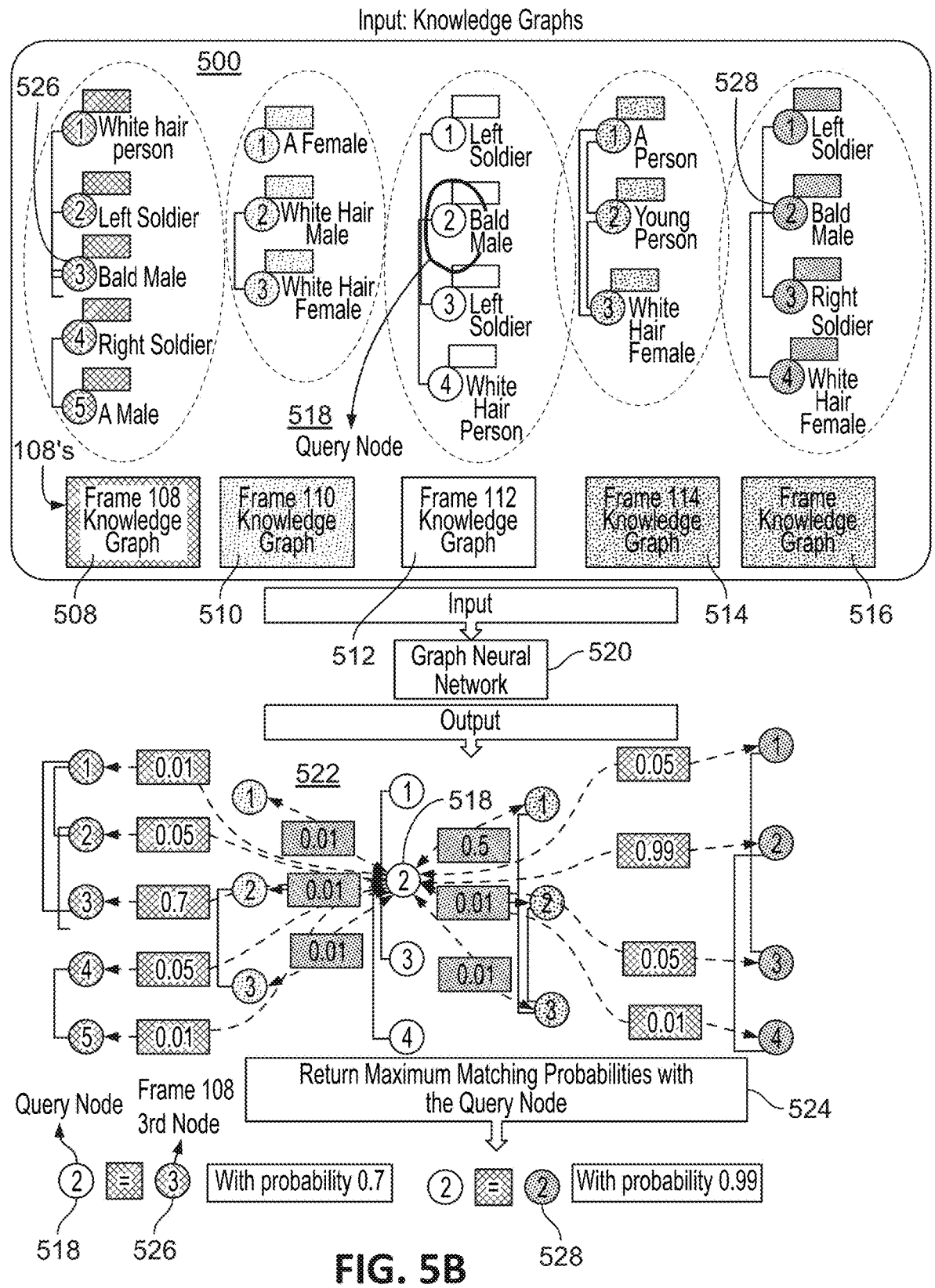

As shown in FIG. 5B, knowledge graphs 508, 510, 512, 514 and 516 may respectively correspond to frames 108, 110, 112, 114 and 116. The media application may use such knowledge graphs in searching for and identifying a same object as the selected object 118 of FIG. 1 across frames, e.g., using knowledge graphs of frames within one or more of neural network 520. For example, for each of knowledge graphs 508, 510, 512, 514 and 516, visual features obtained by, e.g., a CNN model and descriptive features obtained by image captioning may be merged, e.g., using a graph-auto encoder or canonical correlation analysis or any other suitable technique or any combination thereof.

As shown at 522 of FIG. 5B, query node 518 corresponding to selected object 118, and included in knowledge graph 512 may be iteratively compared against nodes of other of knowledge graphs 508, 510, 514 and 516 using one or more of the merged features and neighborhood information of nodes. In some embodiments, such comparison may be made using a Graph Convolution Network (GCN) or Weisfeiler-Lehman Neural Machine, or any other suitable technique or any combination thereof. For example, the GCN may accept as input query node 518 and a node from another of knowledge graphs 508, 510, 514 and 516, the node attributes, and neighborhood connection information, and based on such input, output a probability score, e.g., using a softmax function, which indicates how likely the input nodes represent the same object. In some embodiments, a threshold value (e.g., 0.5) may be used to prune or remove from consideration any node having a probability matching score of less than 0.5 in relation to query node 518. The media application may (at 524) identify nodes having the highest matching probability, e.g., the media application may determine that the highest matches with query node 518 are node 526 of knowledge graph 508 and node 528 of knowledge graph 516. In some embodiments, the media application may perform the processing of FIG. 5B, and/or any other suitable processing described herein, in real time. For example, in some embodiments, a number of frames being searched for similar objects to selected object 118 may be limited to a particular number (e.g., 20 or any other suitable number).

Referring to FIG. 1, at 126, the media application may determine an exact identity of the selected object 118 using any suitable computer-implemented technique. In some embodiments, the media application may train and/or employ a machine learning model that is specifically trained for a particular media asset 106 (e.g., the "Game of Thrones" series, and/or related series such as "House of the Dragon," which is a prequel to "Game of Thrones") to determine an exact identity of the selected object 118. For example, as shown at 604 of FIG. 6, the media application may pre-train and/or employ a pre-trained multiclass machine learning model (e.g., a logistic regression machine learning model, a deep random forest machine learning model, a CNN, or any other suitable model, or any combination thereof) on object types 602, e.g., actors, items, animals, places (or any other suitable object or any combination thereof) of media asset 106. In some embodiments, model 604 may be trained in an offline process. In some embodiments, object types 602 may be associated with labels (e.g., "Princess Rahimyar" or "Lord Caswell") to help train model 604. For example, training image data may be suitably formatted and/or labeled (e.g., with identities of various objects present in media asset 106 in various locations and/or from various perspectives of the object(s)). For example, in training model 604, different poses (images) of actors along with their "labels" (actor's character names) may be used to build a pre-trained model for objects depicted in or otherwise associated with media asset 106.

As shown in FIG. 6, the media application may input (at 608) to model 606 the image of selected object 118 from frame 112, as well as images 303 and 305 of FIG. 3 having been identified as corresponding to or sufficiently similar (e.g., the images across the frames having the maximum match) to object 118. Such images of selected object 118 having been identified across frames of media asset 106 may become "test" examples for pre-trained model 606, and model 606 may output the label "name" of such images, based on model 606 having been trained on objects of media asset 106. For example, model 606 may determine that selected object 118 (and/or images 303 and/or 305) correspond to a label of "Lord Caswell" at 610, and thus "Lord Caswell" may be determined to correspond to selected object 118 having been the subject of the query received at 102 of FIG. 1. For example, the media application may determine the class to which the test image (selected object 118) belongs to be "Lord Caswell" at 610, rather than the class of "Princess Rhaenyra" shown at 612, based on the test image's closeness to the training image corresponding to class 610. In some embodiments, all matched images across frames may be test images, and their classes may be determined by majority voting. In some embodiments, model 606 may be trained on a server-side (e.g., server 1804 of FIG. 18) and parameters learned from the training may be transmitted to one or more client-side devices (e.g., user equipment 1810 of FIG. 18). In some embodiments, feedback may be received from users, e.g., confirming a label for one or more objects, to enable model 606 to updated its parameters.

Referring to FIG. 1, at 128, the media application may determine supplemental content. In some embodiments, the media application may identify supplemental content by determining (as the supplemental content) one or more second presentation points within the presentation duration of media asset 106 related to the object, e.g., selected object 118 of FIG. 1 having been determined to be the subject of the query received at 102. In some embodiments, such one or more second presentation points may correspond to images and/or video associated with image 303 (FIG. 3) from frame 108, and image 305 from frame 116, each having been determined to include an object corresponding to selected object 118 of frame 112. In some embodiments, identifying the supplemental content may be based on user preferences 130 of a user (e.g., the user having submitted the query at 102), to identify personalized (from the perspective of the user) supplementary content related to (e.g., depicting or otherwise describing or relevant to) selected object 118.

In some embodiments, in the context of the one or more second presentation points within the presentation duration of media asset 106, the presentation duration of media asset 106 may be considered to include an entire season, or multiple seasons, of episodic content or serial programming, or media asset 106 may be understood to refer to a single episode or program of such episodic content or serial programming, or any suitable number of episodes across one or more seasons. In some embodiments, the presentation duration of media asset 106 may be considered to include a plurality of related content items or media assets, e.g., each episode of "Game of Thrones" may be considered to be within the presentation duration of "House of the Dragon" for the purposes of identifying supplemental content, since one or more of the same or similar objects may be present in each of "Game of Thrones" (which may be considered a prequel to "House of the Dragon") and "House of the Dragon." In some embodiments, media asset 106 may refer to a particular movie or event or other particular content item having a single part in isolation, or one or more content items of a multi-part content item (e.g., a trilogy of movies, a set of movies or other content having a sequel and a prequel, or any other suitable set of related content items).

In some embodiments, to identify supplemental content at 128, the media application may perform video scene segmentation of media asset 106 and identify the interests of user 134 (e.g., "User A" having submitted the query at 102) based on characteristics of each scene, frame or other portion of media asset 106 and behavior of user 134 in relation to such scenes, frames or portions and/or similar portions in other media assets. For example, the media application may divide one or more portions of media asset 106 (e.g., a particular episode of "House of the Dragon" or "Game of Thrones") into video scene segments (VSSs) and collect at least two types of metadata: (a) the VSS's metadata, e.g., scene type; popularity of, or other characteristics of, objects or actors in scene; other suitable scene characteristics, or any combination thereof, and (b) the user's metadata, e.g., whether a user re-watched a scene; skipped a scene; paused a scene; or if a user reacted to a scene and/or facial or verbal expressions to a scene; or any other suitable user metadata; or any combination thereof. In some embodiments, based on such video scene segmentation and collection of metadata, the media application may identify the most relevant scenes (from the perspective of the user) about the identified object (selected object 118) for presentation as supplemental content.

In some embodiments, the media application may associate a VSS with the VSS's metadata and the user's metadata to generate and/or identify causal relationships among the metadata. For example, a media asset or portion thereof (e.g., an episode) may be considered to comprise multiple scenes, where each scene may comprise multiple shots, and each shot may comprise a sequence of multiple frames. The media application may identify matches between scene and shot boundaries, e.g., the media application may determine that a third shot corresponds to an end of a first scene, using any suitable computer-implemented technique. For example, the media application may employ one or more supervised or unsupervised machine learning models that may determine, for example, clusters of shots according to shot color similarity, where shots in the same clusters may be deemed as scene segmentations, e.g., cluster boundaries being the match between scene and shot boundaries. Additionally or alternatively, different types of metadata (e.g., place, cast, action, audio) may be utilized to determine matching boundaries between a scene and a shot, to take into account that a scene might depict various different places or backgrounds. For example, to segment the scenes of media asset 106, the media application may merge metadata indicative of shot boundaries with representative learning, e.g., Bi-directional LSTM to obtain super shot boundaries, as discussed in more detail in Rao et al., "A local-to-global approach to multi-modal movie scene segmentation," In Proceedings of the IEEE/CVF Conference on Computer Vision and Pattern Recognition, pages 10146-10155, 2020, the contents of which is hereby incorporated by reference herein in its entirety.

In some embodiments, the media application may then iteratively group the super shot boundaries to determine final video scene boundaries and/or segmentations. After segmenting the scenes of media asset 106, the media application may collect metadata about each of the scenes of media asset 106. Such metadata may include scene type; popularity of, or other characteristics of, objects or actors in scene; voices or other audio or sound effects or music in the scene; other suitable scene characteristics; or any combination thereof. As discussed in connection with FIG. 6, objects in the scene may be determined using machine learning model 606, e.g., having been trained using images of objects in media asset 106 from different perspectives. In some embodiments, the popularity of a character can be determined by sorting their casting duration in each episode. In some embodiments, the media application may determine a type of a specific scene probabilistically by using any suitable video and/or image and/or audio classification techniques, e.g., to determine if the specific scene is a fight scene, romance scene or any other suitable type of scene. In some embodiments, the media application may use a supervised learning approach to classify the scenes. In some embodiments, artificial intelligence (AI)-based video and/or image captioning techniques may be utilized for metadata generation associated with objects in frames and/or scenes of media asset 106. In some embodiments, the shots of a specific scene and their descriptions are used together to train one or more machine learning models (e.g., a CNN and language RNN model) to generate captions of the scene to further generate metadata for scenes and/or frames of media asset 106, e.g., using semantic segmentation.

In some embodiments, user preferences 130 of FIG. 1 may be determined for a user profile of user 134 based on past actions on the user with respect to media asset 106 and/or other media content. For example, the media application may monitor, collect and store metadata of a specific user including, for example, a number of re-watch occurrences of a scene in one or more portions of media asset 106; scenes which were skipped or consumed on a higher than normal speed; reactions to specific scenes; scenes in which volume was increased or decreased; whether a particular scene was watched at all; or any other suitable metadata, or any combination thereof. In some embodiments, one or more cameras or other sensors may be used to collect facial or verbal expressions of the user during specific scenes, and such expressions or emotions may be analyzed using one or more machine learning models. For example, such machine learning model may be trained on facial expression recognition on pre-labeled datasets, in which a large volume of facial image collections with various expressions, such as happy, sad, neutral (labels) are stored. Additionally or alternatively, audio expression of the user may be captured (e.g., by a microphone of user equipment 104) and processed using, e.g., an RNN, to interpret and classify a user's audio expressions in reaction to a particular scene.

Figure 7:
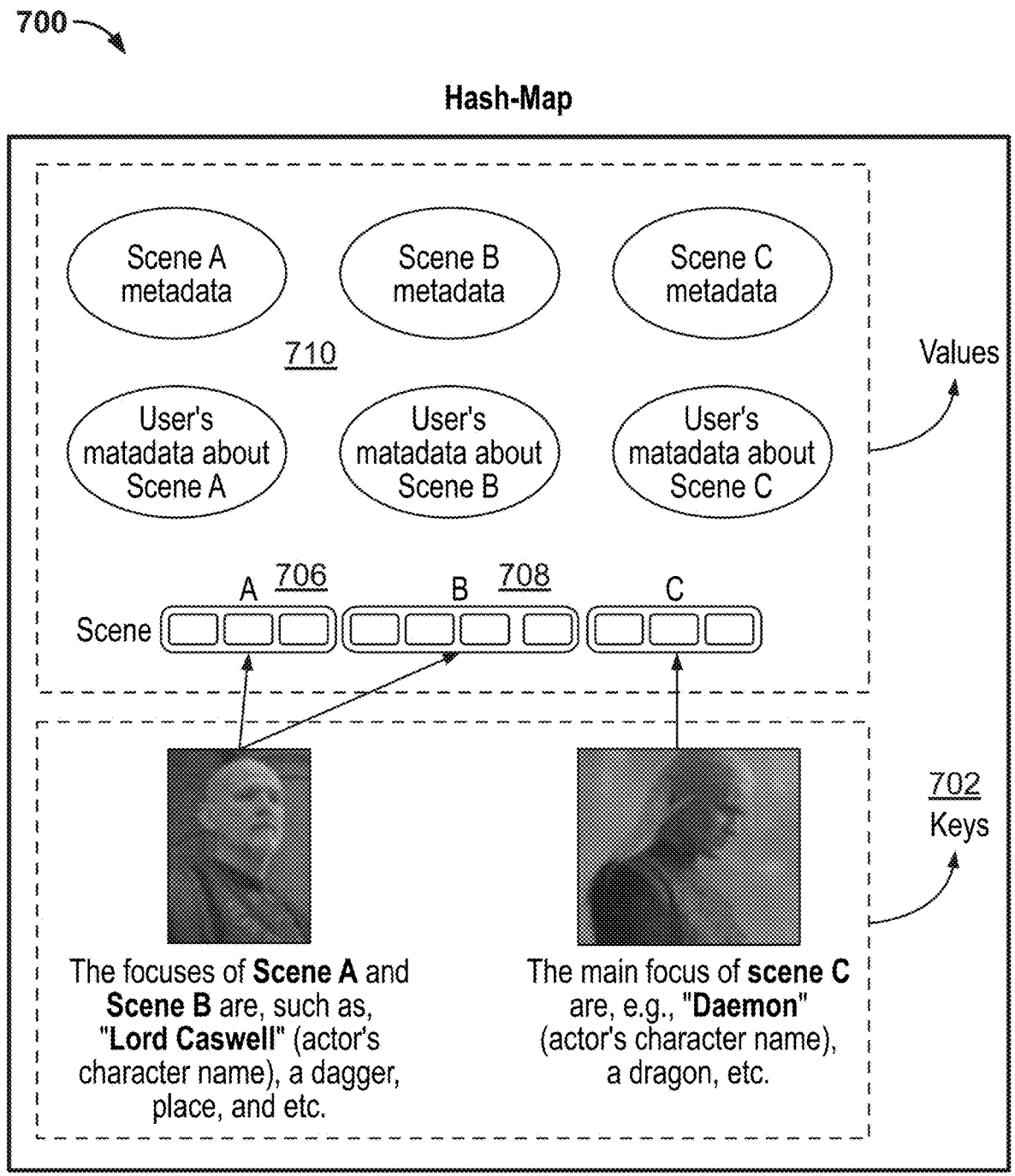
FIG. 7 shows an illustrative hash map, in accordance with some embodiments of the present disclosure.

In some embodiments, the media application, having collected the VSS's metadata and the user's metadata, may determine a relationship between such metadata and the selected object (e.g., object 118 being the subject of query 102 of FIG. 1). For example, the media application may determine, for each scene of media asset 106, one or more main focus objects e.g., prominent or important objects for the scene. The media application may categorize the scenes based on the main focus object of the scene, and may count a duration and/or number of times that an object appears in a scene, to determine one or more of the appearing objects as one or more main focus objects of the scene. In some embodiments, the media application may determine one or more main focus objects of the scene based on identifying one or more objects as being focused on by the camera for a particular scene. As shown in FIG. 7, the scenes of media asset 106 may be associated with one or more corresponding main focus objects within a database, e.g., in the form of a hash map 700, which shows how the main focus object of a specific scene is related to the scene.

Hash map 700 may be used to build association among objects in a particular scene, frame or other portion of media asset 106, their VSSs, VSSs' metadata, and the user's metadata. In some embodiments, after hash map 700 is constructed, the selected object (e.g., object 118 of FIG. 1) can efficiently be fetched by using a key 702 (e.g., an actor's character name or other identifying feature of an object). For example, if the selected object is "Lord Caswell," the media application may fetch all metadata of Scene A and Scene B, indicated at 706 and 708. The selected object-related scene and metadata may be shown at 710. In some embodiments, the main focus object might not be the selected object; in such cases, the media application may create hierarchical, key-based hash maps with the second, third, and so on, most appeared object.

Figure 8:
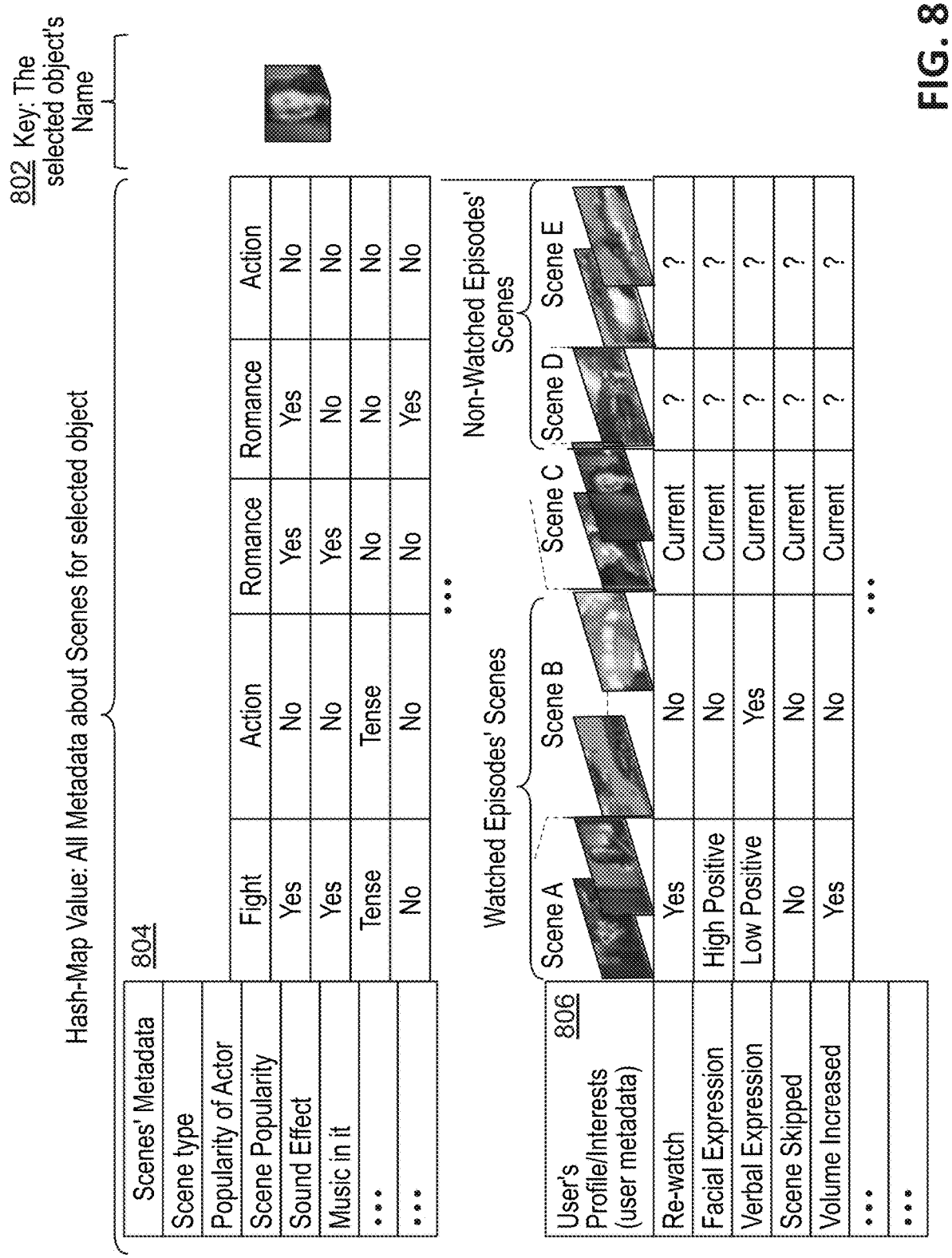
FIG. 8 shows an illustrative hash map, in accordance with some embodiments of the present disclosure.

As shown in FIG. 8, after constructing the relationship between VSSs and objects in a database, the media application can fetch relevant VSS's using the VSS metadata 804 by using the user-selected object 118 as key 802. In some embodiments, prior user behavior pertinent to each VSS may be recorded as metadata, as shown at 806, which may indicate whether a user watched each particular scene and/or reactions or other interactions of the user with media asset 106 during the particular scene.

Figure 9:
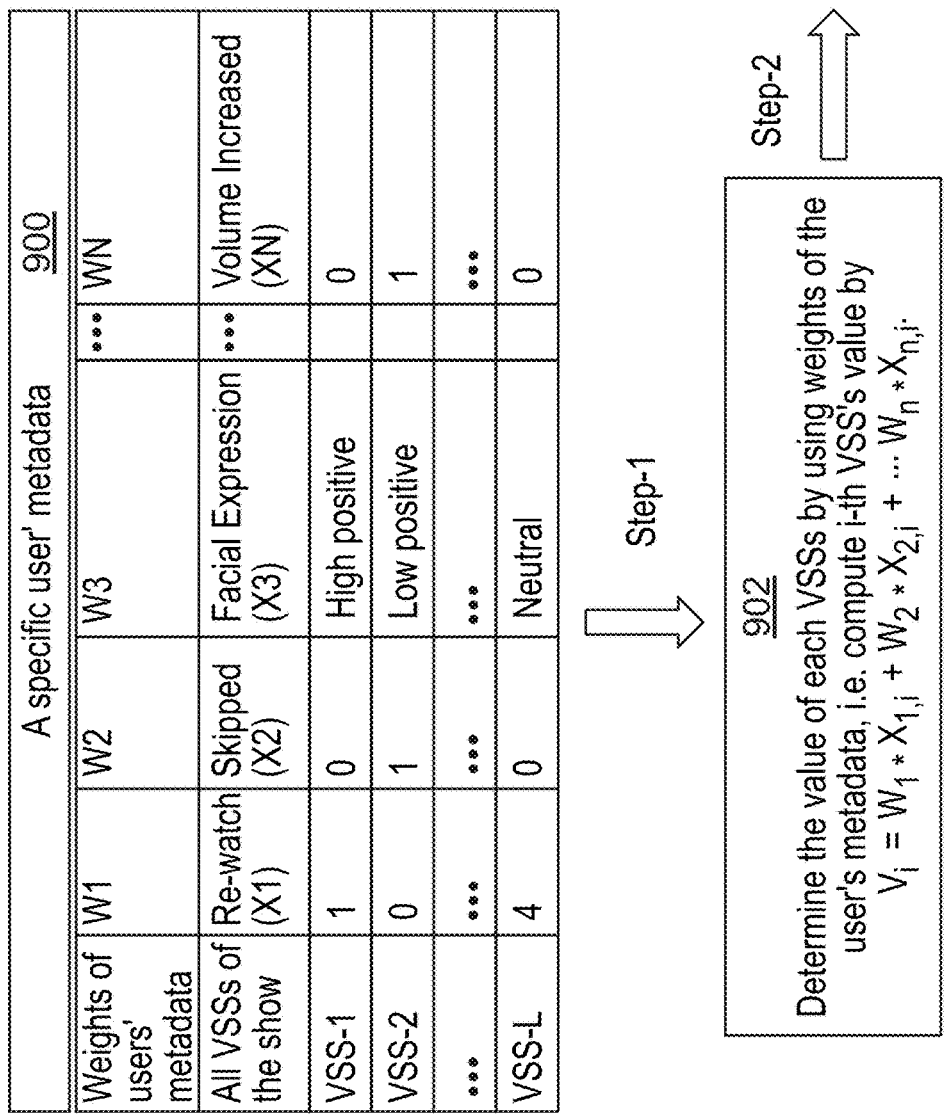
FIG. 9 shows an illustrative process for determining portions of a media asset relevant to a user and a selected object, in accordance with some embodiments of the present disclosure.

In some embodiments, at 128 of FIG. 1, the media application, when identifying supplemental content, may identify the most relevant scenes (from the perspective of user 134) related to the identified object (e.g., selected object 118 of FIG. 1). As shown in FIG. 9, the media application may determine which VSSs a user liked (and/or which VSSs are associated with user actions indicative of user interest) among all VSSs based on the user's metadata 900. The media application may determine which scene metadata is associated with such VSSs liked by the user (or otherwise associated with user interest), and use such information to obtain the most relevant content. For example, assuming that there are N metadata of users and M metadata of all VSSs of the TV show, and the user's metadata is represented by $X_1, X_2, \ldots, X_N$, and the VSS's metadata is represented by $Y_1, Y_2, \ldots, Y_M$, the media application may determine the top-K liked VSS's for a user. The media application may (as shown at 902) determine a value for each VSS by using linear combinations of the user's metadata using the following equation (2):

$$V_i = W_1 * X_{1,i} + W_2 * X_{2,i} + \ldots W_n * X_{n,i}. \quad (2)$$

where $W_1, W_2, \ldots, W_N$ are weights for each metadata item of the user and determine the importance of each metadata, e.g., a re-watched scene might be more important than a skipped scene. Such weights may be predetermined by a domain expert or the system, or dynamically adjusted based on monitoring the user's consumption behavior. In some embodiments, the media application may determine the weights of users' metadata using neural networks or any other suitable computer-implemented technique. For example, the media application may label such metadata by using additional information of the user (e.g., nationality, gender, demographic information, geographic information, or any other suitable information of the user, or any combination thereof) and learn weights for classifying these labels, to further personalize the user's metadata weights. In equation (2), the media application may linearly combine i-th row of the user metadata to compute a value for i-th VSS. Since these values may be accumulative, for determining the top-K liked VSSs by the user, the media application may sort and return the top-K most valued VSSs as liked VSSs, as shown at 904.

Figure 10:
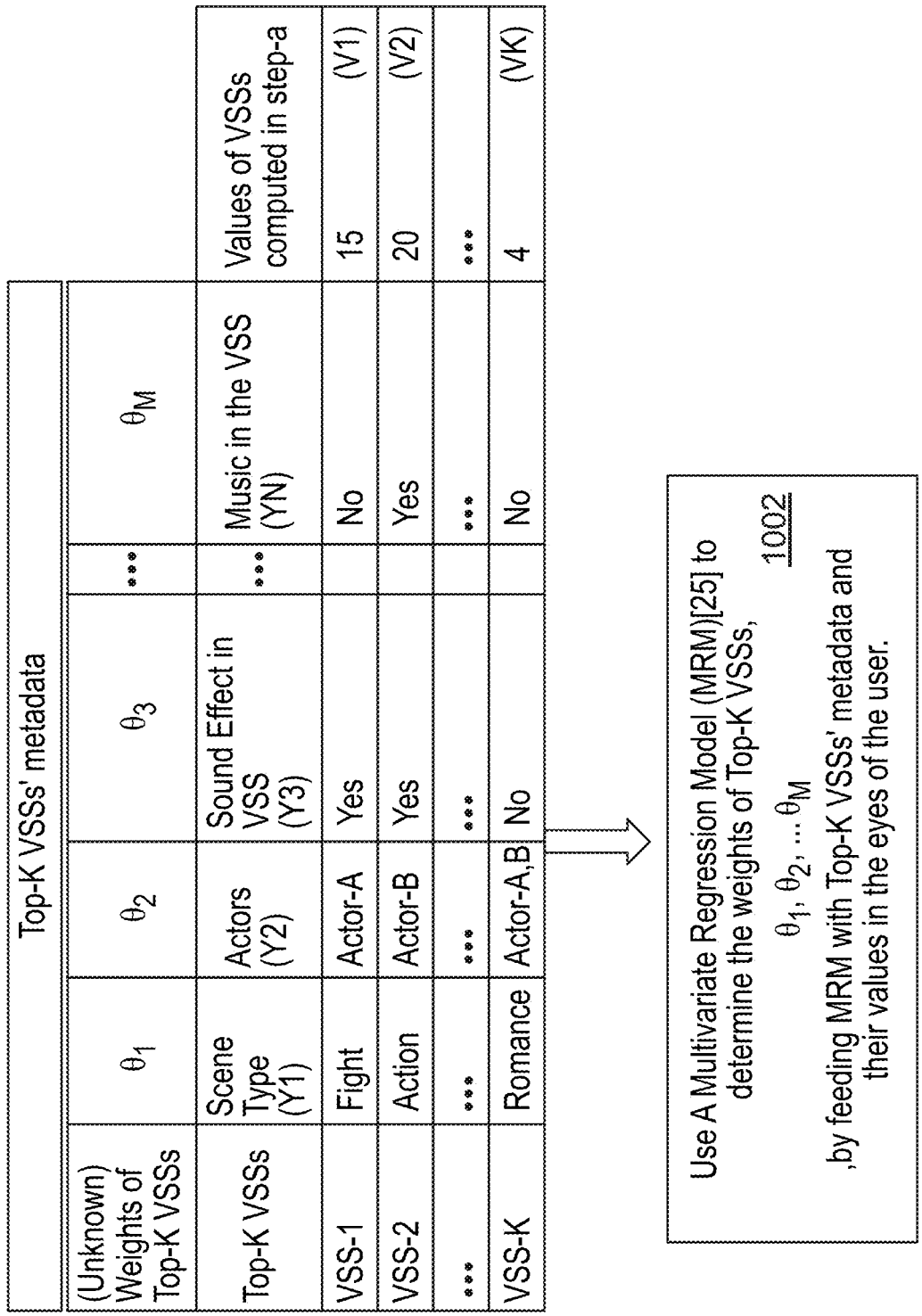
FIG. 10 shows an illustrative process for determining portions of a media asset relevant to a user and a selected object, in accordance with some embodiments of the present disclosure.

As shown in FIG. 10, the media application may determine which scene metadata is associated in the VSSs liked by the user (or otherwise associated with user interest). The media application, having determined the importance of a scene to the user based on the user's metadata, may determine the contribution of the scene's metadata (e.g., weights of liked VSS's metadata). For example, the media application identifies the VSS's metadata and outcome of such metadata from the perspective of the user (values of liked VSSs), and the media application may determine how to adjust weights of the metadata such that the rows of the data fit to their outcomes. That is, as shown at 1002, the media application may determine $\Theta_1, \Theta_2 \ldots, \Theta_M$, weights of the VSS's metadata, e.g., using multivariate regression models (MRMs) and/or any other suitable computer-implemented technique. The MRM may achieve this by adjusting columns' weights of the data iteratively until the data fits its outcome. For example, the MRMs may utilize a gradient descent technique to update weights of columns.

To obtain the most relevant supplemental content to selected object 118 of FIG. 1, the media application may access or fetch all VSSs related to selected object 118, e.g., determined by using model 606 of FIG. 6 or any other suitable object detection mechanism. The media application may then use the determine $\Theta_1, \Theta_2 \ldots, \Theta_M$, weights of the VSSs' metadata to rank the VSSs' based on their weights using equation (3) as follows:

$$R_i = \Theta_1 * Y_{1,i} + \Theta_2 * Y_{2,i} + \ldots \Theta_M * Y_{m,i}. \quad (3)$$

The media application may compute a score for each VSS depicting or otherwise associated with the selected object by using the scenes' weights and VSSs' metadata, and may return a highest scored scene as a first candidate supplemental content item. In some embodiments, the metadata may be dependent, and in such a case, the media application can perform dimensionality reduction techniques, e.g., CNN, or any other suitable technique, prior to employing one or more MRMs.

In some embodiments, the media application may employ techniques for inferring scene metadata of value to a particular user in combination with or derived directly from the user based on preferences or other input received from user 134. For example, the media application may explicitly determine user 134 prefers the action genre to the romance genre, or implicitly infer such information based on monitoring the viewer's content consumption history and/or interactions with one or more portions of a plurality media assets. In some embodiments, the media application may consider the history of user selections or interactions with one or more media assets in combination with the VSS-based approach to infer scene metadata of greatest value to the user.

In some embodiments, if the highest scored VSS related to selected object 118 has not yet been watched by user 134, the media application may blur or obscure or otherwise replace one or more scenes or frames (or portions thereof, e.g., a particular object and/or character) of such unwatched content, to prevent spoilers. In some embodiments, an inference model, e.g., a Bayesian belief network (BBN), or any other suitable computer-implemented technique, may be added to hash map 700 of FIG. 7. Such BBN-based approach may take into account the manner in which a scene's metadata affects the likeability of the scene with respect to user 134, and/or the manner in which the likeability of the scene affects the user's metadata. In some embodiments, only VSSs' in a current or past episode may be considered, to avoid providing any spoilers in the supplemental content.

Figure 11:
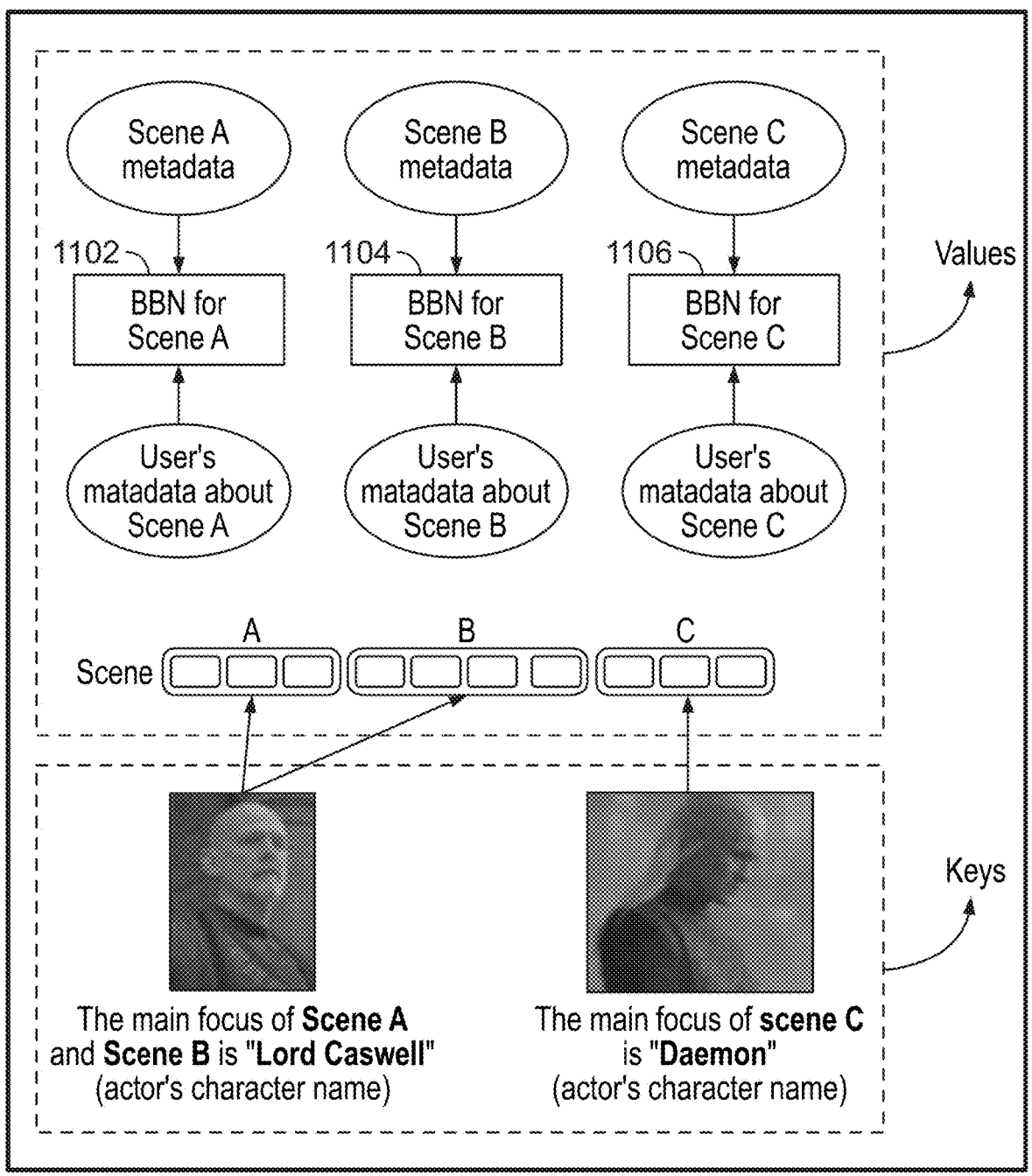
FIG. 11 shows an illustrative hash map, in accordance with some embodiments of the present disclosure.

In some embodiments, the media application may construct the BBN in an offline environment to causally relate user's metadata, a specific scene's metadata, and the scene itself. For example, the BBN construction may be employed to determine the causal effects (triggering effects) of the scene's metadata that cause the user to like or positively interact with the scene, and how the user's metadata is affected by the scene, if the user likes or positively interacts with the scene. The media application may create a BBN for each scene of media asset 106 (e.g., in hash map 700) that is determined to have been consumed by user 134 (e.g., indicated in the user profile of user 134), and the BBN for each scene may be included in hash map 1100, as shown at 1102, 1104 and 1106 of FIG. 11.

Figure 12:
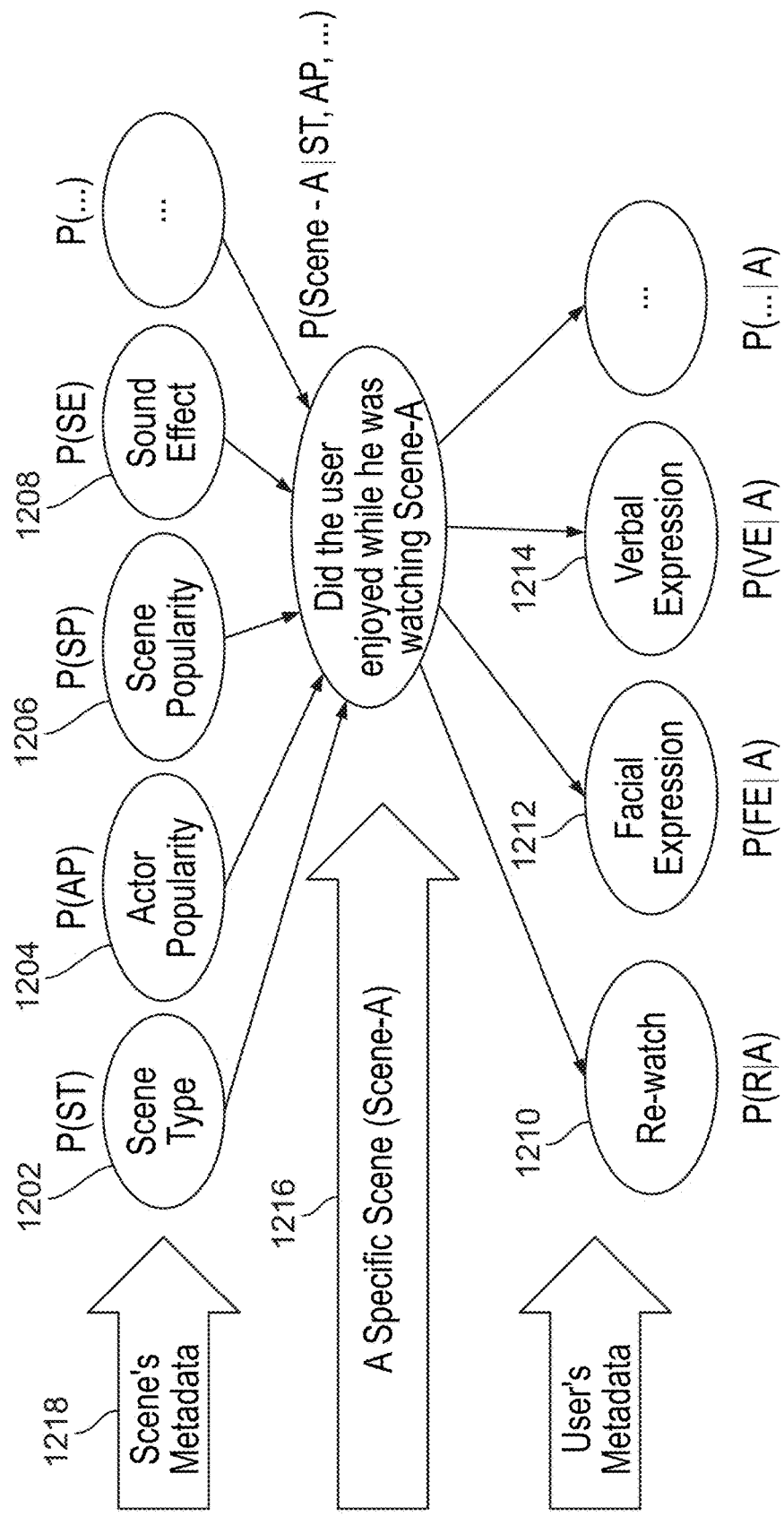
FIG. 12 shows an illustrative process for determining portions of a media asset relevant to a user and a selected object, in accordance with some embodiments of the present disclosure.
Figure 13:
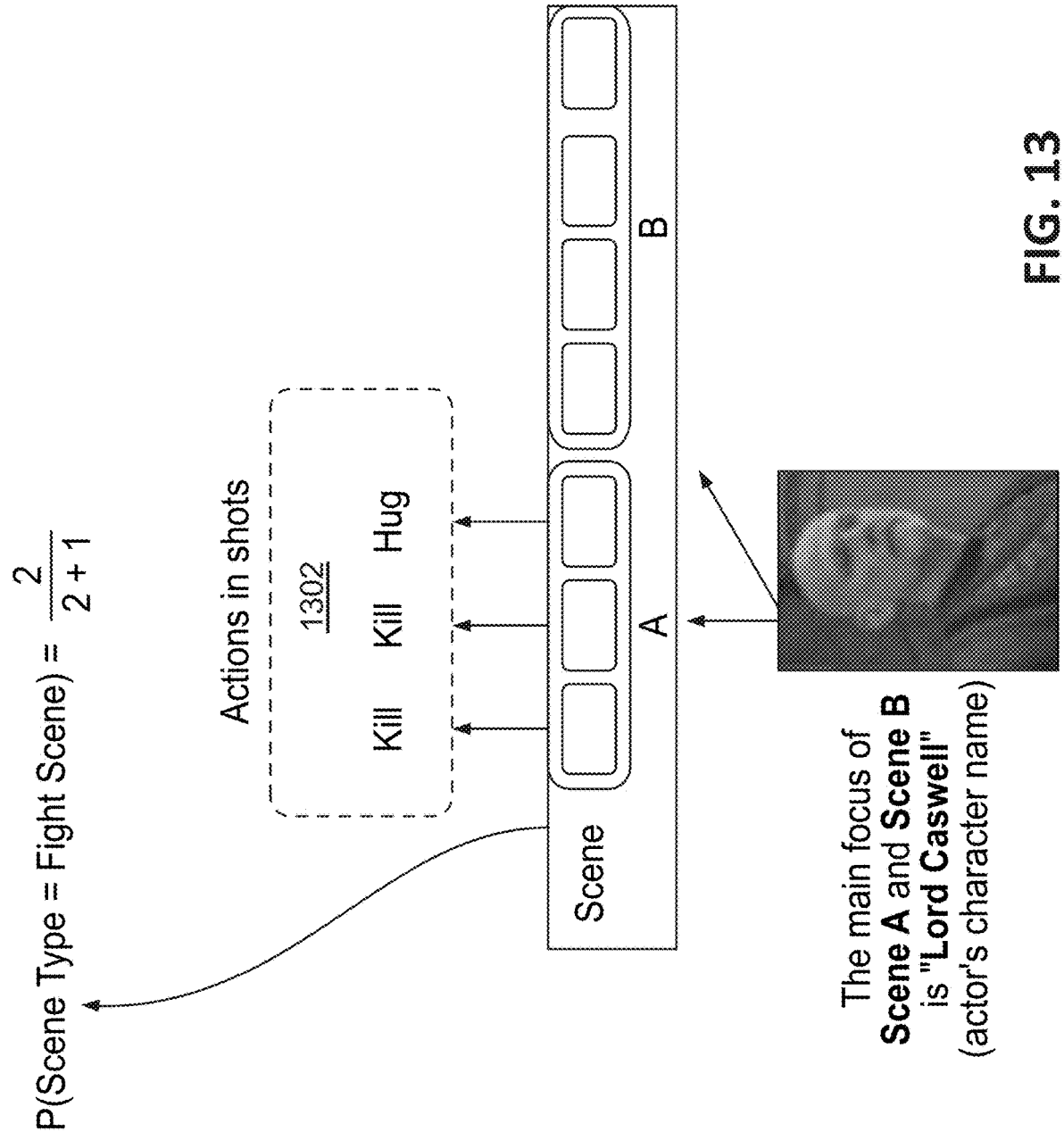
FIG. 13 shows an illustrative technique for determining a main focus of a portion of a media asset, in accordance with some embodiments of the present disclosure.

As shown in FIG. 12, the media application may create, for each watched scene, a single BBN and compute its probability values, each BBN being created from a specific scene's metadata, the scene, and user's metadata for watched episodes. Such probabilities of key features in the scene, e.g., as P (scene type) 1202, P (actor and/or character Popularity) 1204, P (Scene Popularity) 1206, P (sound effect) 1208, P (Re-watch) 1210, P (Facial Expression) 1212, P (verbal expression) 1214, P (whether a specific scene is liked or of interest to the user). In computing the prior probabilities of the scene's metadata 1218 for each scene of each object, the media application may analyze the shots (or other suitable portions) of a scene. For example, for selected object 118 (e.g., the object corresponding to the character "Lord Caswell"), a particular scene's (e.g., Scene A's) metadata-related statistic may be computed by analyzing Scene A's three shots. For example, as shown in FIG. 13, if Scene-A corresponds to "Lord Caswell is killing two enemies and saving his wife and hugging her," the actions in consecutive shots may be identified as "kill," "kill," and "hug," as shown at 1302 of FIG. 13. The media application may determine that the probability of Scene-A being a fight scene is ⅔ based on identifying the two fight actions and one romance action. That is, the metadata statistic for scene type of Scene-A can be P(ST=fight scene)=⅔ or P(ST=romance)=⅓. These actions in the shots can be learned by a CNN feature fusion, and/or using any other suitable computer-implemented technique. For example, the CNN may be trained with action images and an indicator of the action (e.g., the label "hugging" or "sword fighting"), and the trained model may be used to determine the actions in shots or scenes of media asset 106.

Similarly, other key features related to a scene and their related metadata statistics (e.g., prior probability values) can be computed. For example, to determine P (Actor Popularity), the media application can determine how many times popular characters and/or actors are shown in shots across a scene. Alternately, this could be framed as P (popular character and/or actor appears). In some embodiments, the media application may compute prior probabilities of the scene itself and the user's metadata for each scene of each object, e.g., P (Re-watch), P (Facial Expression). For example, the prior probability of the scene itself, e.g., P(Scene-A is liked by the user), can be fixed to a prior probability value depending on how frequently the user is watching media asset 106. In some embodiments, the prior probability values for the user's metadata can be computed by using the user's historical behavior, e.g., P(Re-watch) can be deemed to be a number of re-watched shots of scenes divided by number of shots of all scenes.

Figure 14:
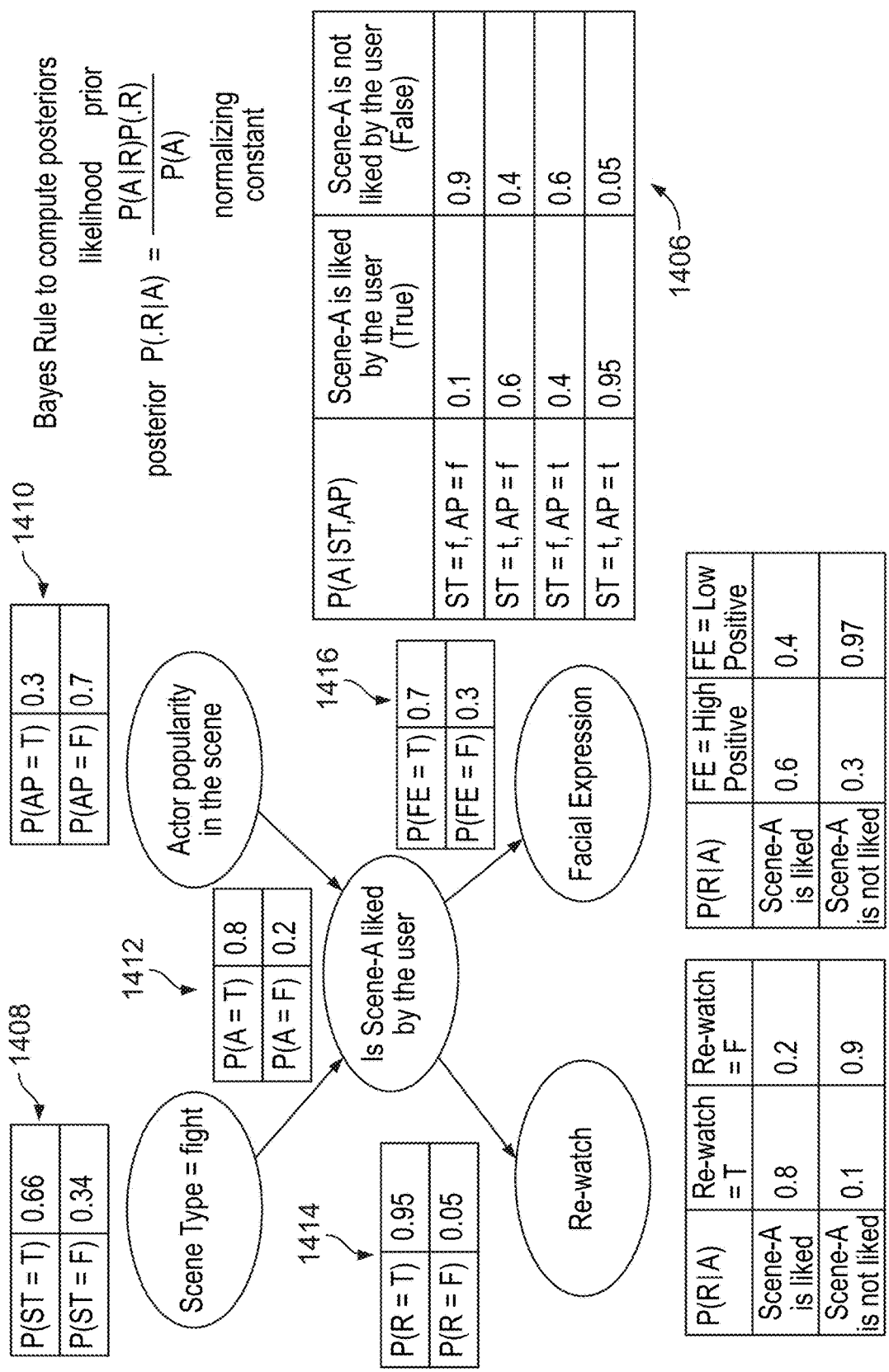
FIG. 14 shows an illustrative process for determining portions of a media asset relevant to a user and a selected object, in accordance with some embodiments of the present disclosure.

In some embodiments, as shown in FIG. 14, the media application may determine the posterior probabilities (e.g., dependent probabilities, P(X|Y) values for each scene of each object depicted in media asset 106. For example, the media application may compute posterior probability value P(RIA), e.g., what is the probability of user 134 re-watching a particular scene, using the tables of FIG. 13. The media application may determine that likelihood is known information since it is known whether the user re-watches the scene or not, and if user 134 did, how many shots user 134 watched out of all shots (or other portions) of the scene. Thus, the media application may compute values for tables 1402, 1404, 1406 (posterior probabilities) in an offline manner.

In some embodiments, an online BBN may be used for user-dependent querying of BBNs to find the most relevant supplementary content about the selected object. For example, after scenes related to the selected object (e.g., object 118 of FIG. 1) are fetched from hash map 1100, the media application may query each scene's BBN using user-dependent queries and compute a score for each BBN. The media application may use such queries to compute a score for each BBN and return the supplementary content having a BBN associated with the highest score. For example, a query for a specific user may be P(Scene Type=Fight Scene, Actor and/or Character Popularity=True|Facial Expression=Scared); while for another user, the query may be P(Scene Type=Romance, Actor and/or Character Popularity=True|Facial Expression=Happy, Re-watch=True). Such queries can be efficiently computed by using prior probability tables (1408, 1410, 1412, 1414, 1416) and posterior probability tables (1402, 1404, 1406) in FIG. 14. Such aspects may enable effectively querying all possible scenarios for specific users to present the selected object's supplementary content. In some embodiments, watch history may be used to weight such queries to enable the presentation of earlier or the latest supplemental content.

Figure 15:
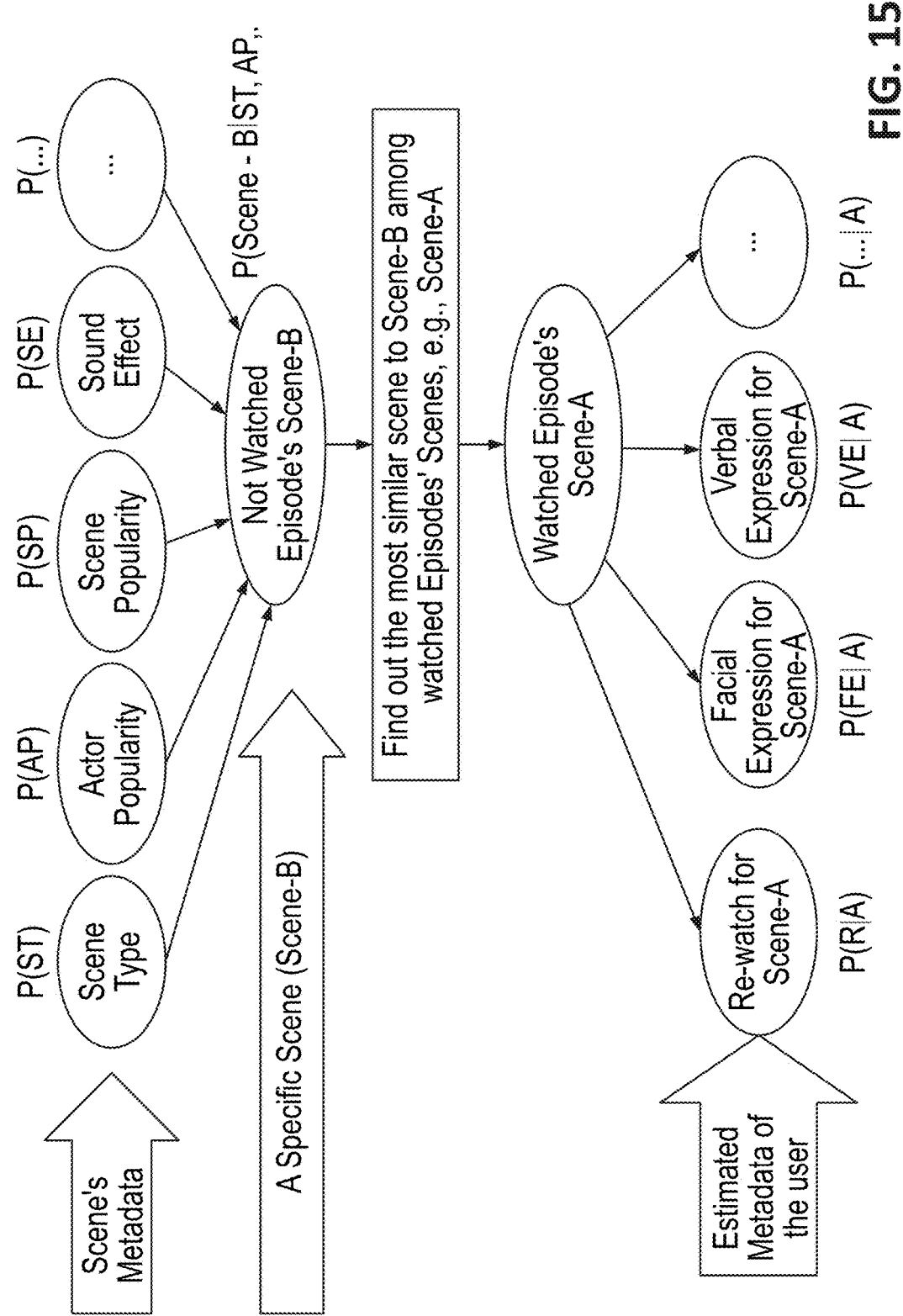
FIG. 15 shows an illustrative process for determining portions of a media asset relevant to a user and a selected object, in accordance with some embodiments of the present disclosure.

In some embodiments, as shown in FIG. 15, the media application may, in identifying supplemental content at 128 of FIG. 1 that a user has not yet watched in media asset 106, create different types of BBN structures comprising estimations of the user's metadata-based prior probabilities. For example, the media application may use such estimated statistics since there may not be information regarding a scene the user has not yet watched. As shown in FIG. 15, BBNs may be created for each unwatched scene of media asset 106 based on estimated metadata of the user. For example, the media application may estimate the user's metadata statistics based on a value computed by measuring the similarity of the unwatched scenes of media asset 106 to watched scenes of media asset 106 and/or other similar media assets. In some embodiments, the media application can use a scene's metadata and visual content to determine similarity scores among scenes, and a best matched watched scene's user metadata may be used as the estimated metadata of the user for the unwatched scene. In some embodiments, the BBN may be created based at least in part using maximum likelihood estimation techniques and/or Bayesian neural networks.

Referring to 132 of FIG. 1, the media application, having identified the supplemental content using one or more of the techniques described herein, may generate for display the supplemental content. For example, the media application may generate for display at user equipment 104 a simultaneous display of a first time point within a presentation duration of media asset 106 (e.g., corresponding to frame 112, or a frame occurring shortly after frame 112) at which selection of object 118 may have been received, as well as supplemental content 138 related to selected object 118 (e.g., depicting a more clear version of object 118 and/or providing an explanation to clarify the identify and/or significance of object 118 in the context of media asset 106). In the example of FIG. 1, currently displayed content 136 may correspond to, e.g., season 2, episode 10 of "House of the Dragon," and supplemental content 138 (e.g., if the queried object corresponds to the character "Daemon") may correspond to, e.g., "season 1, episode 2" of "House of the Dragon." In some embodiments, the media application may identify supplemental content from a related media asset, e.g., "Game of Thrones," released prior to "House of the Dragon" and to which "House of the Dragon" is a prequel, since "Game of Thrones" may have content relevant to a selected object 118.

Figure 16A:
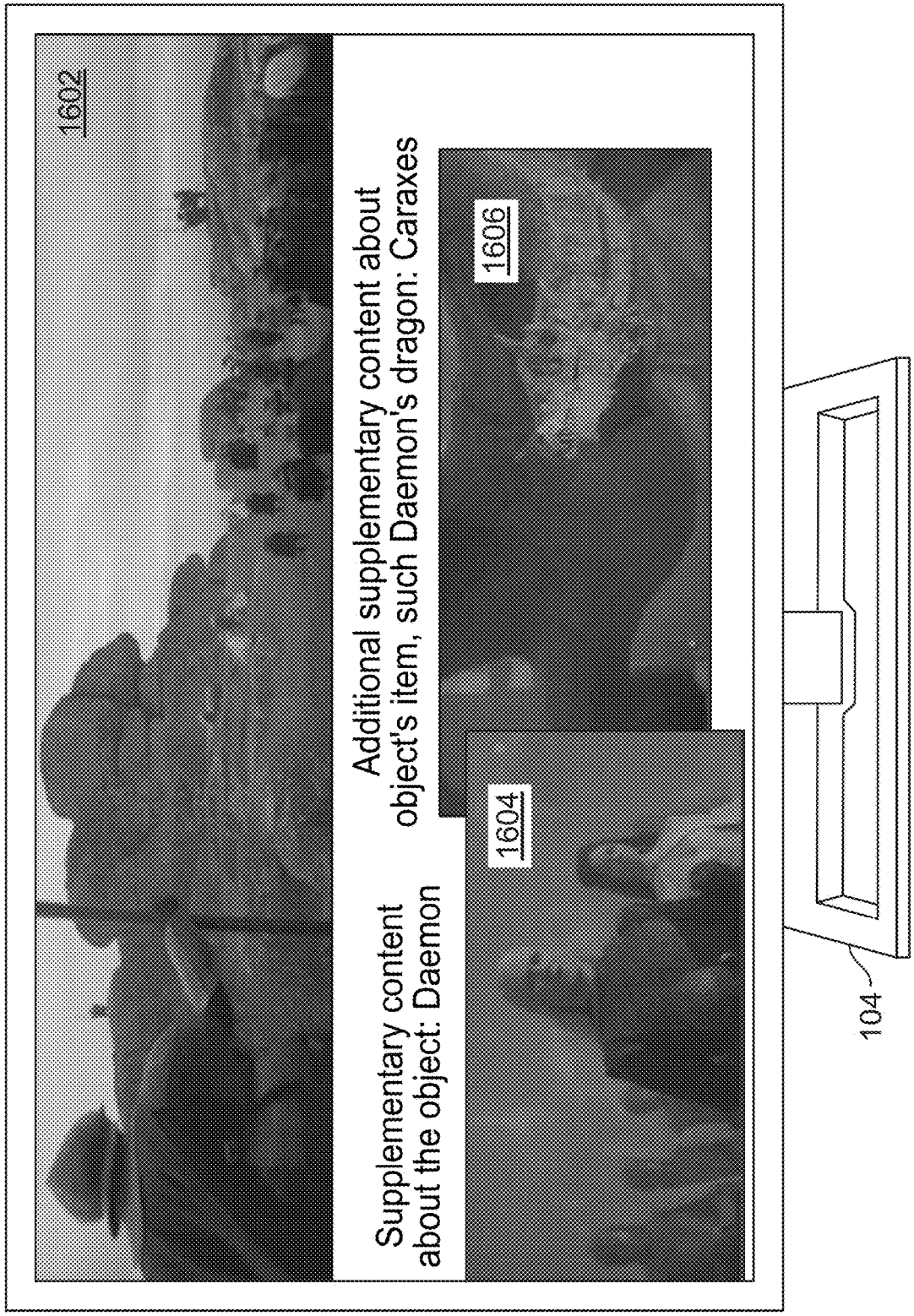
FIGS. 16A-16B show illustrative examples of generating for display supplemental content, in accordance with some embodiments of the present disclosure.

Any suitable number of supplemental content items may be generated for display simultaneously. For example, in FIG. 16A, if the selected object corresponds to the character "Daemon," 1602 may represent a current streaming position of media asset 106 within a duration of media asset 106 (e.g., a frame at which "Daemon" object is selected or shortly after such selection, and/or within the same scene as the frame when the selection was received). In such example, supplemental content 1604 related to the selected object (e.g., depicting the character "Daemon") may be generated for display, and additional supplemental content 1606 (e.g., depicting the character "Daemon's" dragon, Caraxes, or any other suitable object associated with Daemon) may be generated for display at user equipment 104. For example, the additional supplemental content associated with the selected object's may be presented, e.g., if the selected object is a person, he or she might be a dragon rider and additional content about his or her dragon, dagger, or any other suitable object or item, or any combination thereof, can be presented.

Figure 16B:
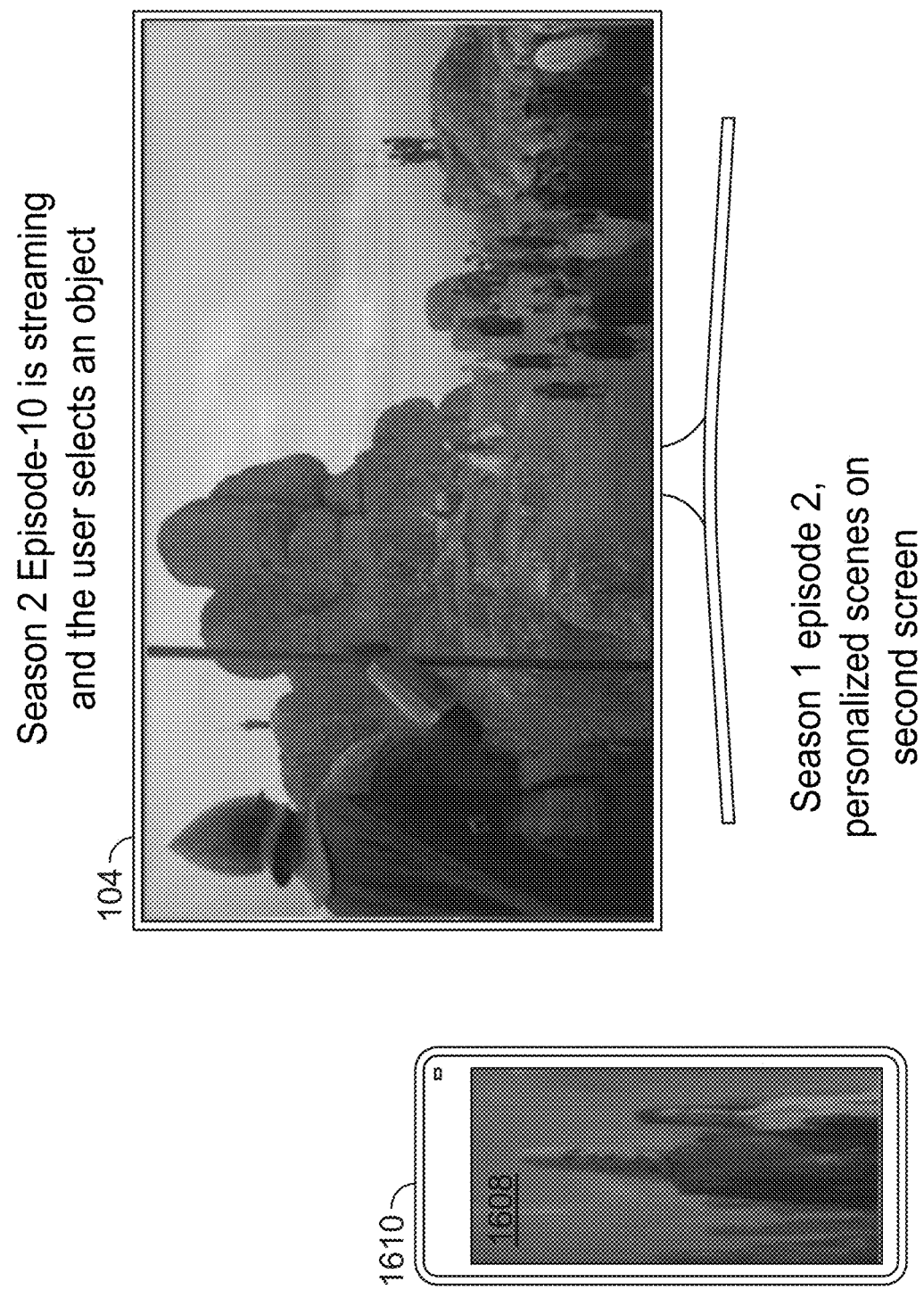

In some embodiments, providing supplemental content 138 may be performed by providing such content automatically (e.g., in a picture-in-picture or PIP window), or to launch another app (e.g., a map to show a location) related to selected object 118 or a music app to show the full lyrics related to selected object 118. In some embodiments, as shown in FIG. 16B, supplemental content 1608 may be provided, either automatically or based on receiving confirmation from user 134, to a second screen device, e.g., mobile device 1610 in a vicinity of user equipment 104. Mobile device 1610 may be a smartphone, a tablet, a laptop, a smart watch, or any other suitable computing device capable of displaying supplemental content, or any combination thereof. For example, this may be done to prevent interrupting user equipment 104's display of media asset 106 to other users (if multiple people are consuming media asset 106 in the same physical location), and/or one or more applications used to provide supplemental content 1608 may be installed on mobile device 1610 but not on user equipment 104. For example, the media application may be generating for display Season 2, episode 10 of "House of the Dragon" at user equipment 104, and supplemental content 1608 may be generated for display at mobile device 1610 (e.g., mobile device 1610 may receive a deeplink from a search service to automatically launch an appropriate application and transmit an API request with the appropriate parameters, e.g., location, name of song, or any other suitable parameters, or any combination thereof).

In some embodiments, supplemental content 1608 is provided to mobile device 1610 based on the media application detecting that multiple people are watching media asset 106 in a same physical location. For example, an OTT application providing media asset 106, or any other suitable website or application or operating system, can display a list of nearby devices that can receive the content, and the viewer or viewers can select the device(s) or a default device can be chosen.

In some embodiments, a selection of object 118 may be received via a subtitle, e.g., the user may select a portion of the screen displaying "Lord Caswell" in the subtitles, or the media application may receive user input (e.g., voice or text or touch input) of "Who is Lord Caswell?" upon the user seeing his or her name in the subtitles or otherwise hearing his or her name uttered in media asset 106, and the media application may provide personalized supplemental content related to "Lord Caswell" as described herein.

In some embodiments, media asset 106 (e.g., "House of the Dragon") may be a prequel or sequel to other content (e.g., "Game of Thrones") which may be considered as part of media asset 106 or as a separate media asset. In some embodiments, media asset 106 may be part of a universe of content, e.g., the Marvel Universe. In such cases, any suitable portion of "House of the Dragon" or "Game of Thrones" or any suitable movie or other content part of the Marvel Universe may be processed to present supplementary content across shows. For example, a dagger object, or an iron throne object, depicted in "House of the Dragon" may have also been depicted in "Game of Thrones," and the supplemental content regarding such objects may be retrieved from "Game of Thrones." As another example, a user may be consuming a first "Marvel" superhero movie, and a particular superhero in such "Marvel" movie may also be depicted in a different, second "Marvel" movie, and the supplemental content for the first movie may be retrieved from the first and/or second movies.

In some embodiments, the supplemental content may be retrieved from sources external to media asset 106. For example, the media application may search, or cause a search of, a search engine (or video database or any other suitable website or database) to query the identified name of the selected object, such as, for example, "Lord Caswell," corresponding to selected object 118. In some embodiments, the media application may query such external sources upon determining that there is not supplemental content available to the user in the content itself, such as if the user's watch history is limited and any retrieval of supplemental content might constitute a spoiler, and/or if the user is not subscribed to (or is otherwise unable to access) a content source at which the supplemental content is available. Based on the information determined from such one or more external sources, the media application may generate for display supplemental content 138. For example, the media application may fetch text information about a queried object from any suitable website, e.g., a Wikipedia or wiki page related to media asset 106; content from reviews or critics of media asset 106; a book; an article (or other content from any other suitable medium) corresponding to or otherwise related to media asset 106. In some embodiments, the media application can submit a search into one or more search engines or video databases, e.g., "Lord Caswell" or "Best scene of"+"Lord Caswell" and render the top listed video contents (or any other suitable content) to the user from online streaming platforms (or any other suitable source).

In some embodiments, the supplemental content may correspond to content that is not itself depicted or described in media asset 106, but instead may correspond to content that media asset 106 is derived from or that media asset 106 is based on. For example, for a television series based on a book, certain events or characters or other objects that are present in the book may be omitted from the television series (which may correspond to media asset 106). As an example, in the television series "Game of Thrones," the character "Lady Stoneheart" is part of the plot of the novels "A Song of Ice and Fire" on which the television series "Game of Thrones" is based, but such "Lady Stoneheart" character is not shown in the television series. On the other hand, the character "Lady Catelyn Stark" is present in both the television series and the novels before being killed, and in the in the novels, such character "Lady Catelyn Stark" is brought back to life as "Lady Stoneheart," although this does not occur in the television series. Thus, the media application may identify supplemental content as a website or video (or other content from an external source) related to omitted events, characters or other objects, e.g., explaining the relationship of "Lady Stoneheart" and "Lady Catelyn Stark," such as in response to receiving a selection of an object corresponding to the character "Lady Catelyn Stark" or an object otherwise related to the character "Lady Catelyn Stark."

Figure 17:
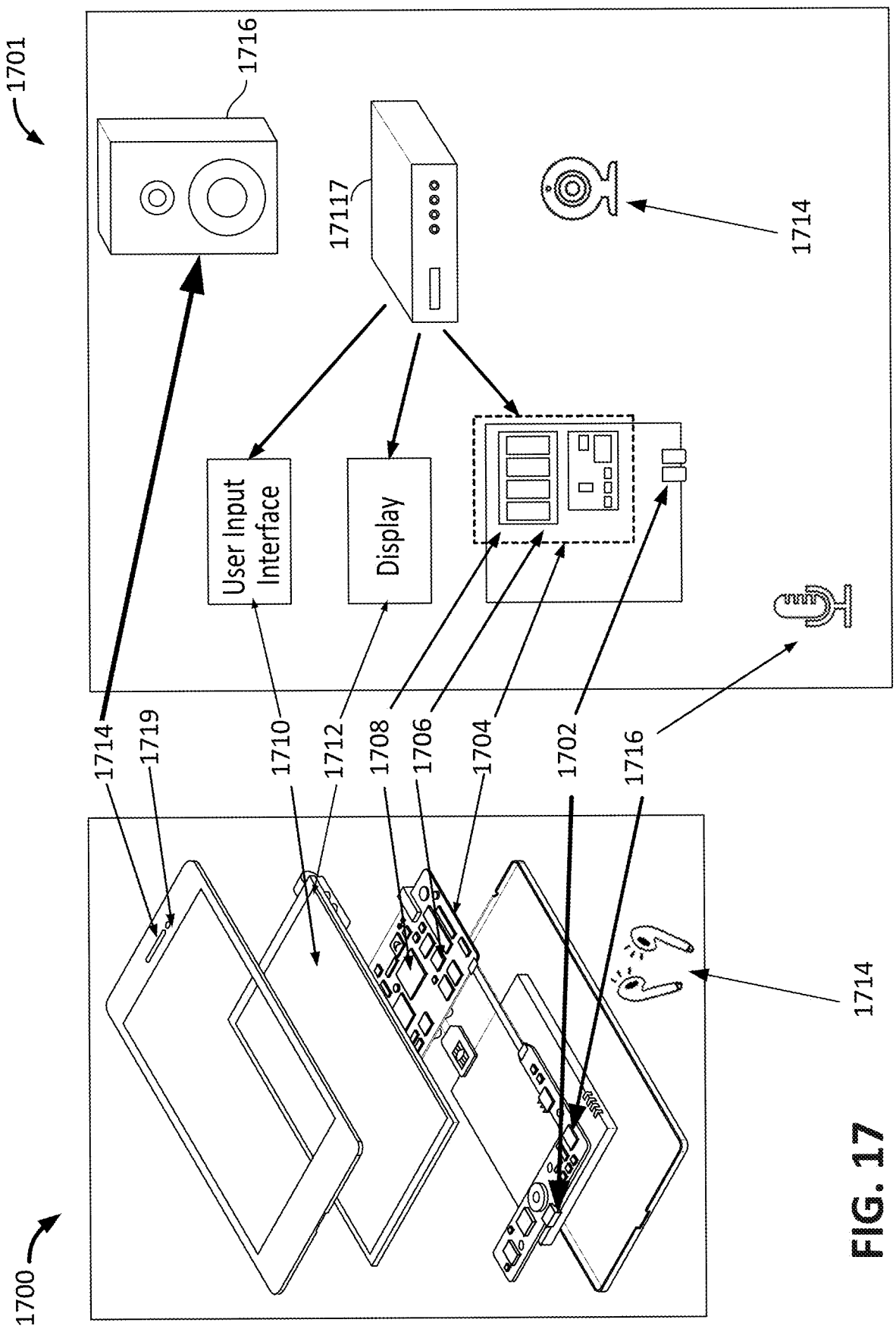
FIGS. 17-18 show illustrative devices, systems, servers, and related hardware for generating for display supplemental content, in accordance with some embodiments of the present disclosure.

FIGS. 17-18 describe illustrative devices, systems, servers, and related hardware for identifying and generating for display supplemental content, in accordance with some embodiments of the present disclosure. FIG. 17 shows generalized embodiments of illustrative user devices 1700 and 1701, which may correspond to, e.g., user equipment 104 of FIG. 1 and FIGS. 16A-16B. For example, user device 1700 may be a smart television, smartphone device, a tablet, a near-eye display device, an XR device, a laptop, a desktop, a smart watch, or any other suitable computing device. In another example, user device 1701 may be a user television equipment system or device. User device 1701 may include set-top box 1715. Set-top box 1715 may be communicatively connected to microphone 1716, audio output equipment (e.g., speaker or headphones 1714), and display 1712.

In some embodiments, microphone 1716 may receive audio corresponding to a voice of a video conference participant and/or ambient audio data during a video conference. In some embodiments, display 1712 may be a television display or a computer display. In some embodiments, set-top box 1715 may be communicatively connected to user input interface 1710. In some embodiments, user input interface 1710 may be a remote-control device. Set-top box 1715 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user devices are discussed below in connection with FIG. 18. In some embodiments, device 1700 may comprise any suitable number of sensors (e.g., gyroscope or gyrometer, or accelerometer, etc.), and/or a GPS module (e.g., in communication with one or more servers and/or cell towers and/or satellites) to ascertain a location of device 1700. In some embodiments, device 1700 comprises a rechargeable battery that is configured to provide power to the components of the device.

Each one of user device 1700 and user device 1701 may receive content and data via input/output (I/O) path 1702. I/O path 1702 may provide content (e.g., broadcast programming, on-demand programming, internet content, content available over a local area network (LAN) or wide area network (WAN), and/or other content) and data to control circuitry 1704, which may comprise processing circuitry 1706 and storage 1708. Control circuitry 1704 may be used to send and receive commands, requests, and other suitable data using I/O path 1702, which may comprise I/O circuitry. I/O path 1702 may connect control circuitry 1704 (and specifically processing circuitry 1706) to one or more communications paths (described below). I/O functions may be provided by one or more of these communications paths, but are shown as a single path in FIG. 17 to avoid overcomplicating the drawing. While set-top box 1715 is shown in FIG. 17 for illustration, any suitable computing device having processing circuitry, control circuitry, and storage may be used in accordance with the present disclosure. For example, set-top box 1715 may be replaced by, or complemented by, a personal computer (e.g., a notebook, a laptop, a desktop), a smartphone (e.g., device 1700), an XR device, a tablet, a network-based server hosting a user-accessible client device, a non-user-owned device, any other suitable device, or any combination thereof.

Control circuitry 1704 may be based on any suitable control circuitry such as processing circuitry 1706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1704 executes instructions for the media application stored in memory (e.g., storage 1708). Specifically, control circuitry 1704 may be instructed by the media application to perform the functions discussed above and below. In some implementations, processing or actions performed by control circuitry 1704 may be based on instructions received from the media application.

In client/server-based embodiments, control circuitry 1704 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 17, the instructions may be stored in storage 1708, and executed by control circuitry 1704 of a device 1700.

In some embodiments, the media application may be a client/server application where only the client application resides on device 1700, and a server application resides on an external server (e.g., server 1804 and/or media content source 1802). For example, the media application may be implemented partially as a client application on control circuitry 1704 of device 1700 and partially on server 1804 as a server application running on control circuitry 1811. Server 1804 may be a part of a local area network with one or more of devices 1700, 1701 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1804 and/or an edge computing device), referred to as "the cloud." Device 1700 may be a cloud client that relies on the cloud computing capabilities from server 1804 to identify and/or generate supplemental content. The client application may instruct control circuitry 1704 to identify and/or generate supplemental content. In some embodiments, server 1804 and/or database 1805 (and/or user equipment 1807, 1808 and/or 1810) may store user preferences 130.

Control circuitry 1704 may include communications circuitry suitable for communicating with a server, edge computing systems and devices, a table or database server, or other networks or servers. The instructions for carrying out the above mentioned functionality may be stored on a server (which is described in more detail in connection with FIG. 18). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 18). In addition, communications circuitry may include circuitry that enables peer-to-peer communication of user devices, or communication of user devices in locations remote from each other (described in more detail below).

Memory may be an electronic storage device provided as storage 1708 that is part of control circuitry 1704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1708 may be used to store various types of content described herein as well as media application data described above. Nonvolatile memory may also be used (e.g., to launch a boot-up routine and other instructions). Cloud-based storage, described in relation to FIG. 17, may be used to supplement storage 1708 or instead of storage 1708.

Control circuitry 1704 may include video generating circuitry and tuning circuitry, such as one or more analog tuners, one or more MPEG-2 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 1704 may also include scaler circuitry for upconverting and downconverting content into the preferred output format of user device 1700. Control circuitry 1704 may also include digital-to-analog converter circuitry and analog-to-digital converter circuitry for converting between digital and analog signals. The tuning and encoding circuitry may be used by user device 1700, 1701 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1708 is provided as a separate device from user device 1700, the tuning and encoding circuitry (including multiple tuners) may be associated with storage 1708.

Control circuitry 1704 may receive instruction from a user by way of user input interface 1710. User input interface 1710 may be any suitable user interface, such as a remote control, mouse, trackball, keypad, keyboard, touch screen, touchpad, stylus input, joystick, voice recognition interface, or other user input interfaces. Display 1712 may be provided as a stand-alone device or integrated with other elements of each one of user device 1700 and user device 1701. For example, display 1712 may be a touchscreen or touch-sensitive display. In such circumstances, user input interface 1710 may be integrated with or combined with display 1712. In some embodiments, user input interface 1710 includes a remote-control device having one or more microphones, buttons, keypads, any other components configured to receive user input or combinations thereof. For example, user input interface 1710 may include a handheld remote-control device having an alphanumeric keypad and option buttons. In a further example, user input interface 1710 may include a handheld remote-control device having a microphone and control circuitry configured to receive and identify voice commands and transmit information to set-top box 1715.

Audio output equipment 1714 may be integrated with or combined with display 1712. Display 1712 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1712. Audio output equipment 1714 may be provided as integrated with other elements of each one of device 1700 and device 1701 or may be stand-alone units. An audio component of videos and other content displayed on display 1712 may be played through speakers (or headphones) of audio output equipment 1714. In some embodiments, audio may be distributed to a receiver (not shown), which processes and outputs the audio via speakers of audio output equipment 1714. In some embodiments, for example, control circuitry 1704 is configured to provide audio cues to a user, or other audio feedback to a user, using speakers of audio output equipment 1714. There may be a separate microphone 1716 or audio output equipment 1714 may include a microphone configured to receive audio input such as voice commands or speech. For example, a user may speak letters or words that are received by the microphone and converted to text by control circuitry 1704. In a further example, a user may voice commands that are received by a microphone and recognized by control circuitry 1704. Camera 1718 may be any suitable video camera integrated with the equipment or externally connected. Camera 1718 may be a digital camera comprising a charge-coupled device (CCD) and/or a complementary metal-oxide semiconductor (CMOS) image sensor. Camera 1718 may be an analog camera that converts to digital images via a video card.

The media application may be implemented using any suitable architecture. For example, it may be a stand-alone application wholly implemented on each one of user device 1700 and user device 1701. In such an approach, instructions of the application may be stored locally (e.g., in storage 1708), and data for use by the application is downloaded on a periodic basis (e.g., from an out-of-band feed, from an internet resource, or using another suitable approach). Control circuitry 1704 may retrieve instructions of the application from storage 1708 and process the instructions to provide video conferencing functionality and generate any of the displays discussed herein. Based on the processed instructions, control circuitry 1704 may determine what action to perform when input is received from user input interface 1710. For example, movement of a cursor on a display up/down may be indicated by the processed instructions when user input interface 1710 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1704 may allow a user to provide user profile information or may automatically compile user profile information. For example, control circuitry 1704 may access and monitor network data, video data, audio data, processing data, participation data from a conference participant profile. Control circuitry 1704 may obtain all or part of other user profiles that are related to a particular user (e.g., via social media networks), and/or obtain information about the user from other sources that control circuitry 1704 may access. As a result, a user can be provided with a unified experience across the user's different devices.

In some embodiments, the media application is a client/server-based application. Data for use by a thick or thin client implemented on each one of user device 1700 and user device 1701 may be retrieved on-demand by issuing requests to a server remote to each one of user device 1700 and user device 1701. For example, the remote server may store the instructions for the application in a storage device. The remote server may process the stored instructions using circuitry (e.g., control circuitry 1704) and generate the displays discussed above and below. The client device may receive the displays generated by the remote server and may display the content of the displays locally on device 1700. This way, the processing of the instructions is performed remotely by the server while the resulting displays (e.g., that may include text, a keyboard, or other visuals) are provided locally on device 1700. Device 1700 may receive inputs from the user via input interface 1710 and transmit those inputs to the remote server for processing and generating the corresponding displays. For example, device 1700 may transmit a communication to the remote server indicating that an up/down button was selected via input interface 1710. The remote server may process instructions in accordance with that input and generate a display of the application corresponding to the input (e.g., a display that moves a cursor up/down). The generated display is then transmitted to device 1700 for presentation to the user.

In some embodiments, the media application may be downloaded and interpreted or otherwise run by an interpreter or virtual machine (run by control circuitry 1704). In some embodiments, the media application may be encoded in the ETV Binary Interchange Format (EBIF), received by control circuitry 1704 as part of a suitable feed, and interpreted by a user agent running on control circuitry 1704. For example, the media application may be an EBIF application. In some embodiments, the media application may be defined by a series of JAVA-based files that are received and run by a local virtual machine or other suitable middleware executed by control circuitry 1704. In some of such embodiments (e.g., those employing MPEG-2, MPEG-4, HEVC or any other suitable digital media encoding schemes), media application may be, for example, encoded and transmitted in an MPEG-2 object carousel with the MPEG audio and video packets of a program.

FIG. 18 is a diagram of an illustrative system 1800 for enabling user-controlled extended reality, in accordance with some embodiments of this disclosure. User devices 1807, 1808, 1810 (which may correspond to, e.g., device 1700 or 1701 of FIG. 17) may be coupled to communication network 1809. Communication network 1809 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1809) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 18 to avoid overcomplicating the drawing.

Although communications paths are not drawn between user devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user devices may also communicate with each other directly through an indirect path via communication network 1809.

System 1800 may comprise media content source 1802, one or more servers 1804, and/or one or more edge computing devices. In some embodiments, the media application may be executed at one or more of control circuitry 1811 of server 1804 (and/or control circuitry of user devices 1807, 1808, 1810 and/or control circuitry of one or more edge computing devices). In some embodiments, the media content source and/or server 1804 may be configured to host or otherwise facilitate video communication sessions between user devices 1807, 1808, 1810 and/or any other suitable user devices, and/or host or otherwise be in communication (e.g., over network 1809) with one or more social network services.

In some embodiments, server 1804 may include control circuitry 1811 and storage 1816 (e.g., RAM, ROM, Hard Disk, Removable Disk, etc.). Storage 1816 may store one or more databases. Server 1804 may also include an I/O path 1812. I/O path 1812 may provide video conferencing data, device information, or other data, over a local area network (LAN) or wide area network (WAN), and/or other content and data to control circuitry 1811, which may include processing circuitry, and storage 1816. Control circuitry 1811 may be used to send and receive commands, requests, and other suitable data using I/O path 1812, which may comprise I/O circuitry. I/O path 1812 may connect control circuitry 1811 (and specifically control circuitry) to one or more communications paths.

Control circuitry 1811 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1811 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1811 executes instructions for an emulation system application stored in memory (e.g., the storage 1816). Memory may be an electronic storage device provided as storage 1816 that is part of control circuitry 1811.

Figure 19:
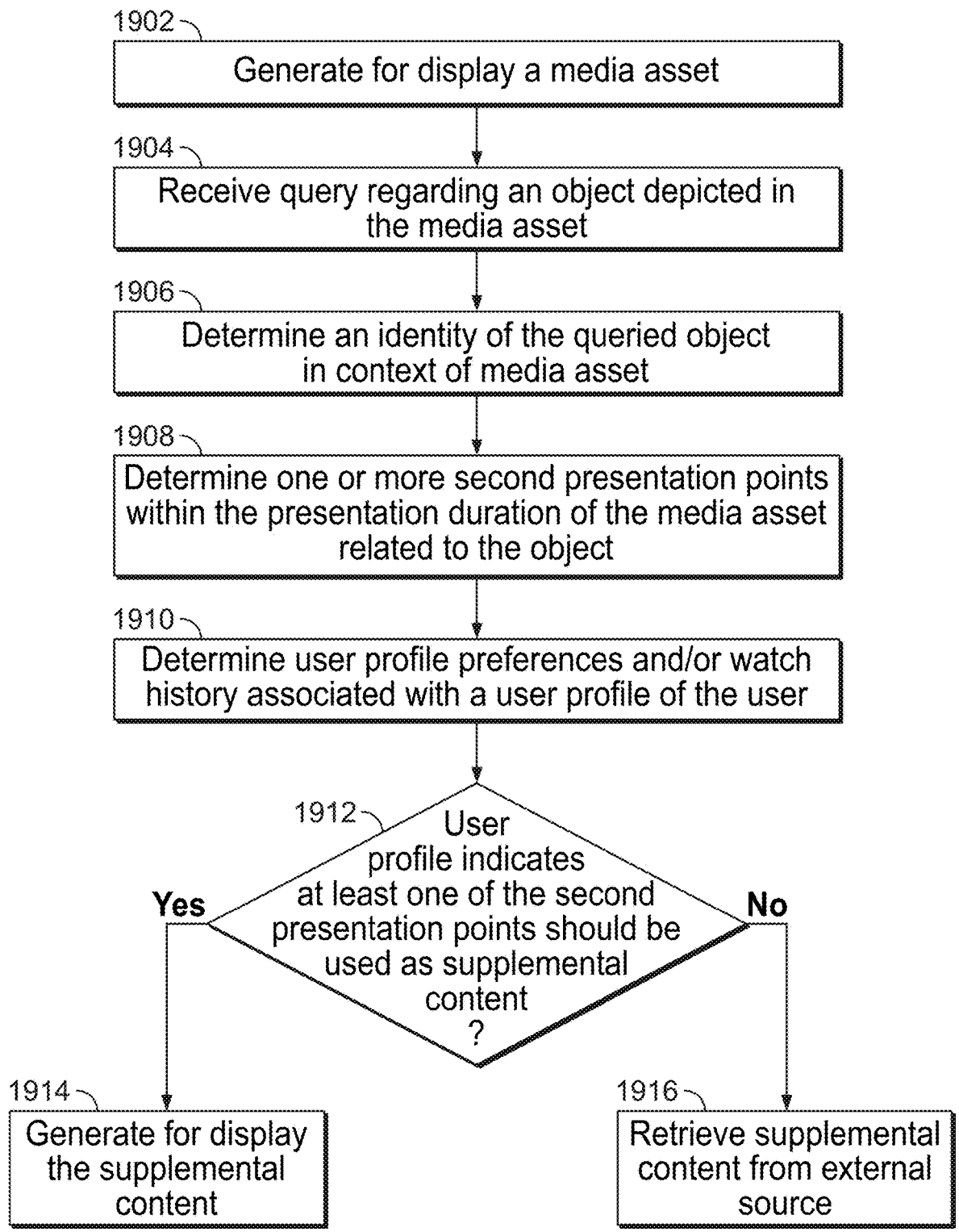
FIG. 19 is a flowchart of a detailed illustrative process for generating supplemental content based on a user query, in accordance with some embodiments of the present disclosure.

FIG. 19 is a flowchart of a detailed illustrative process 1900 for generating supplemental content based on a user query, in accordance with some embodiments of this disclosure. In various embodiments, the individual steps of process 1900 may be implemented by one or more components of the processes, devices and systems of FIGS. 1-18 and 20 and may be performed in combination with any of the other processes and aspects described herein. Although the present disclosure may describe certain steps of process 1900 (and of other processes described herein) as being implemented by certain components of the processes, devices and systems of FIGS. 1-18 and 20, this is for purposes of illustration only. It should be understood that other components of the processes, devices and systems of FIGS. 1-18 and 20 may implement those steps instead.

At 1902, control circuitry (e.g., control circuitry 1704 of FIG. 17 and/or control circuitry 1811 of server 1804) may generate for display a media asset. For example, the control circuitry may receive from a user (e.g., user 134) a request to access a media asset (e.g., media asset 106 which may correspond to season 2, episode 10 of the "House of the Dragon" television series of FIG. 1). Media asset 106 may comprise a plurality of portions (e.g., frames 108, 110, 112, 114 and 116 of Season 2, episode 10 of "House of the Dragon"). In some embodiments, media asset 106 may include episodes of other seasons and/or other episodes of such season, and/or may include other related content (e.g., the prequel to "House of the Dragon," the "Game of Thrones" television series).

At 1904, the control circuitry may determine whether a query (e.g., indicated at 102 of FIG. 1) is received regarding an object depicted in the media asset (e.g., media asset 106 of FIG. 1). Such query may be received at 102 in any suitable form, e.g., as voice input, tactile input, input received via a keyboard or remote, input received via a touchscreen, text-based input, biometric input, or any other suitable input, or any combination thereof. In some embodiments, such query may correspond to a voice query of "Who is that character?" while frame 112 is being generated for display, and the control circuitry may transcribe such audio input, and perform any suitable natural language processing to interpret such voice query. In some embodiments, the query may correspond to a selection of a region of the screen corresponding to object 118 of FIG. 1, or selection of a subtitle associated with object 118 uttering a word or making another sound. In some embodiments, only certain portions of a frame may be queried, e.g., a blue sky in a frame may not be capable of being queried, as it may not be deemed sufficiently relevant to the media asset.

At 1906, the control circuitry may determine an identity of the queried object (e.g., object 118 of FIG. 1) in the context of the media asset (e.g., media asset 106 of FIG. 1). For example, the control circuitry may determining an identity of the object in a context of the media asset by identifying a plurality of portions of the media asset that are related to the object depicted at the first time point of the media asset and associated with the query. Such one or more attributes of the plurality of portions of the media asset to determine the identity of the object in the context of the media asset. For example, such one or more attributes may correspond to one or more of other objects (e.g., an object or location belonging to or otherwise associated with the queried object), a personality trait, subtitles, closed captions, audio (e.g., dialogue and/or music and/or any other suitable sound), other metadata, or any other suitable data, or any combination thereof, associated with the queried object. Such one or more attributes may be identified using any suitable computer-implemented technique described herein, e.g., machine learning, heuristic-based analysis, image and/or audio processing of frames, or any other suitable technique, or any combination thereof.

In some embodiments, the control circuitry may be further configured to determine the identity of the object in the context of the media asset by determining a type of the queried object (e.g., a character in media asset 106 of FIG. 1) and identifying a plurality of portions of the media asset (e.g., frames 108, 110, 112, 114 and 116 of FIG. 3) each depicting one or more objects (e.g., the objects shown at 324 of FIG. 3) of the same type (e.g., a character in media asset 106). The control circuitry may compare the object (e.g., object 118 of FIG. 1) associated with the query to the one or more objects depicted in the plurality of portions of the media asset, and determine one or more matching objects (e.g., objects 303 and 305 of FIG. 3) in the plurality of portions that match the object (e.g., object 118 of FIG. 1) depicted at the first time point of the media asset and associated with the query. For example, the control circuitry may use model 328 of FIG. 3 to identify such one or more matching objects. In some embodiments, as shown in FIGS. 5A-5B, knowledge graph 500 may be used to identify such one or more matching objects.

In some embodiments, as shown in FIG. 6, model 606 may be trained to accept as input images of objects 303, 118, 305 (depicting different visual perspectives of a particular object) and output an identity of the particular object (e.g., "Lord Caswell") in the context of the media asset, and such model 606 may be used to verify the identity of the queried object at 102. In some embodiments, object 118 may be input to model 606, and if such model returns a high confidence of output (e.g., "Lord Caswell") then the use of model 328 and/or knowledge graph 500 may be omitted. On the other hand, if output of such model 606 is determined to be ambiguous regarding an identity of object 118 (e.g., if object 118 is determined to be a character facing away from the camera in the frame in which such object is selected), model 328 and/or knowledge graph 500 may be used to identify additional depictions of selected object 118, and subsequently input to model 606. In some embodiments, only objects used to train model 606 may be capable of being queried during presentation of the media asset.

At 1908, the control circuitry may determine one or more second presentation points within the presentation duration of the media asset related to the object. For example, the query received at 1904 may have been received at a first time point within a presentation duration of the media asset (e.g., 10 minutes into the episode from the start of season 2, episode 10 of the "House of the Dragon") and such one or more second presentation points may correspond to a presentation point that is earlier (within the same episode or within prior episodes of "House of the Dragon" or other related content) or that is later (within the same episode or within later episodes of "House of the Dragon" or other related content), if such content is available. Such one or more second presentation points may also depict selected object 118, although in such one or more second presentation points, object 118 may be depicted in a more clear manner than in frame 112 in which object 118 was queried by the user. In some embodiments, the one or more second presentation points may match, or at least partially match, one or more of the plurality of portions of media asset 106 that may have been determined to include matching objects (e.g., 303 and 305 of FIG. 3) to selected object 118.

At 1910, the control circuitry may determine user profile preferences and/or watch history associated with a user profile of the user (e.g., user 134 of FIG. 1) having submitted the query (e.g., at 102 of FIG. 1). For example, the control circuitry may access a user profile (e.g., at memory of user equipment device 1700 or 1701 and/or at server 1804 or database 1805) to determine whether the one or more second presentation points were previously consumed by the user profile, and/or one or more interactions of the user profile with the one or more second presentation points, which may be indicative of user interest in such second presentation points.

At 1912, the control circuitry may determine whether the user profile indicates that one or more second presentation points should be used as the supplemental content. For example, the control circuitry may utilize one or more of the hash maps and/or data structures described in connection with FIGS. 7-15 to identify, from the one or more second presentation points determined at 1908, whether content associated with at least one of the second presentation points should be used as the supplemental content (e.g., supplemental content 138 of FIG. 1), e.g., the most relevant supplemental content that is relevant to both the selected object and the user's interest and/or watch history. For example, the control circuitry may only identify such at least one of the second presentation points as supplemental content if the user profile indicates that the user has already consumed such content and/or performed one or more actions (e.g., raised the volume of the scene; had a positive reaction of the user was detected; rewatched or rewound the scene or any other suitable action) indicative of user interest in such scene. In some embodiments, portions of media asset 106 not yet watched by the user may not be considered as candidate(s) for supplemental content. Alternatively, portions of media asset 106 not likely to be a spoiler (e.g., a merely explanatory scene not revealing crucial plot points) may be identified as candidate(s) for supplemental content even if not yet watched by the user, or a warning may be provided with the supplemental content that is a potential spoiler. In some embodiments, a ranking of supplemental content options may be presented including one or more of watched and unwatched portions of media asset 106.

At 1914, the control circuitry may generate for display supplemental content (e.g., supplemental content 138 of FIG. 1, or supplemental content 1604 and 1606 of FIG. 16A, or supplemental content 1608 of FIG. 16B) at a device (e.g., user equipment 104) that is providing media asset 106 to the user, and/or at another device (e.g., mobile device 1610 of FIG. 16B). In some embodiments, the supplemental content may correspond to an entire scene identified at the second presentation point or only portions thereof, or a summary of various scenes including the selected object (e.g., object 118 of FIG. 1), or a combination of various portions of media asset 106 having been identified at 1912. In some embodiments, the supplemental content may be presented automatically upon being identified at 1912. In some embodiments, an icon associated with the supplemental content may be generated for display at, e.g., user equipment 104 and/or mobile device 1610, and such icon may correspond to a clearer version of the selected object identified at the one or more second presentation points at 1910 (e.g., corresponding to frames that correlate to the frame of the selected object). In some embodiments, a top ranked supplemental content item may be generated for display from within media asset 106, without taking into account the user profile of the user, e.g., based on a scene's characteristics matching the selected object 118. In some embodiments, each of the supplemental content and media asset is video-based, audio-based, or any combination thereof. Such supplemental content may be provided based on advanced in-content search functionality that can be offered to remind a user of a character, a scene or a place.

In some embodiments, supplemental content may be retrieved based on scene content (e.g., complexity score) and based on the user's querying history. For example, one viewer might consistently query the service about characters, while another is more interested in places or geographic locations, and thus supplemental content may be tailored to such users and/or a machine learning model or other computer-implemented technique used to identify relevant supplemental content may be tailored to identifying such content for a particular user.

In some embodiments, an answer to the query may be determined using previous segments belonging to the content item being watched (e.g., including previous episodes), and the supplemental content in this case may be video-based, e.g., a place or location that is being queried might have been described in a previous scene or episode of a show. The control circuitry may tag "places" to segments in the content, and a query to the system (e.g., by voice) about a place (while watching the content) may result in retrieving such segments and playing them, or retrieving segments in previously watched episodes. In some embodiments, related search queries/videos watched on or uploaded to video-sharing sites or short-form content apps may be used to train one or more of the machine learning models described herein. Such content associated with the tag may be personalized in the sense that it is tied to the user's viewing progress. Such tags may relate to any suitable object or concept, e.g., events such as previous battles, characters referenced in dialogue (e.g., that passed away) in the context of media asset 106. The viewer can be identified based on the profile used to consume the content, voice profile when voice search is conducted and/or any other suitable technique. In some embodiments, different users might be shown different amounts of content based on their viewing progress, e.g., a URL link in a manifest associated with media asset 106 may be personalized based on a viewer's watching progress. In some embodiments, unviewed segments from 'future' episodes can be presented if the query is general in nature and not a spoiler.

At 1916, the control circuitry may retrieve supplemental content from an external source (e.g., a search engine or online database), upon determining at 1912 that adequate supplemental content is not available, e.g., within the runtime of media asset 106. For example, a snippet of object 118 of FIG. 1 (and/or images 303 and/or 305) may be submitted to an online search engine or online database to obtain related supplemental content.

Figure 20:
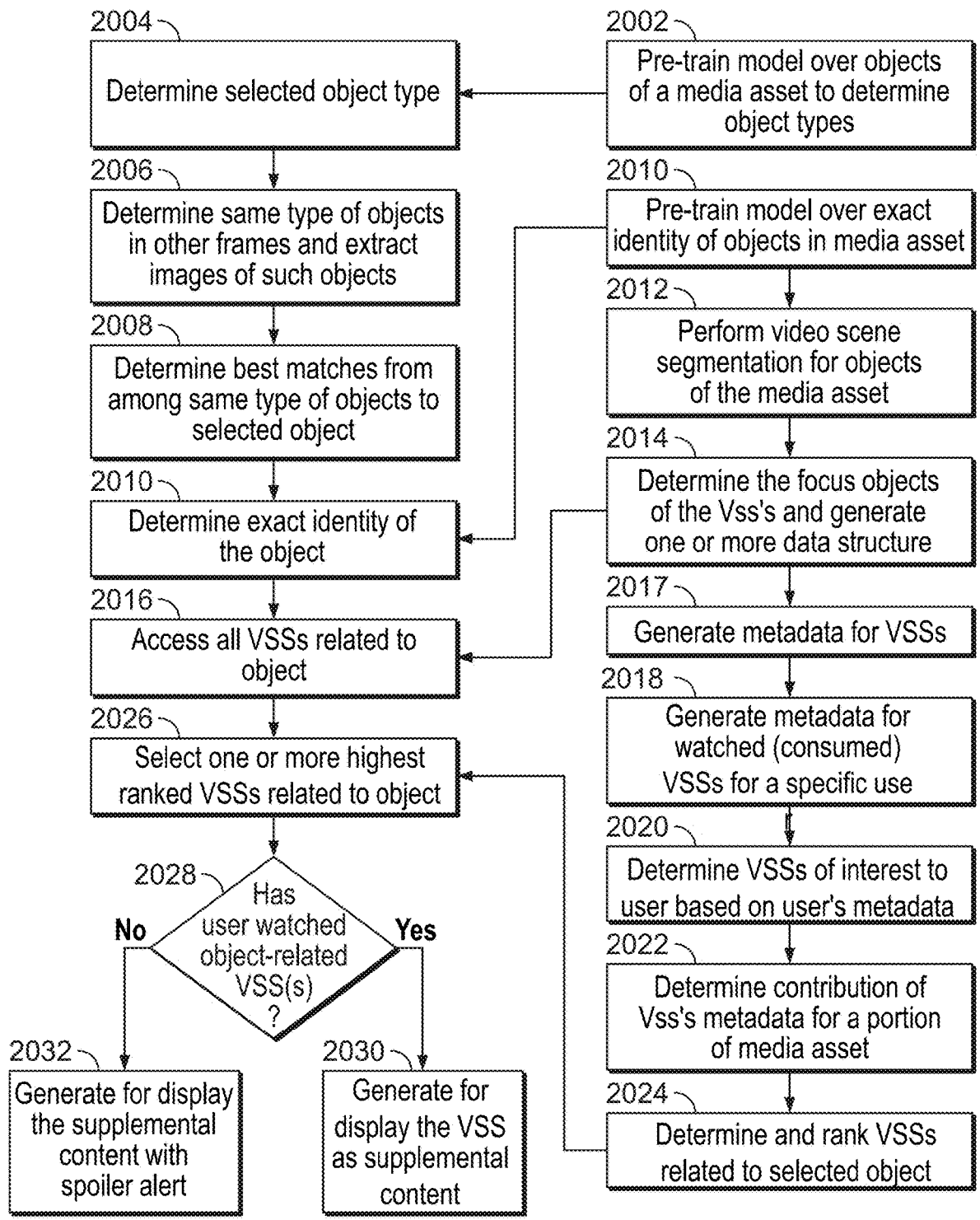
FIG. 20 is a flowchart of a detailed illustrative process for generating supplemental content based on a user query, in accordance with some embodiments of the present disclosure.

FIG. 20 is a flowchart of a detailed illustrative process 2000 for generating supplemental content based on a user query, in accordance with some embodiments of this disclosure. In various embodiments, the individual steps of process 2000 may be implemented by one or more components of the processes, devices and systems of FIGS. 1-19 and may be performed in combination with any of the other processes and aspects described herein. Although the present disclosure may describe certain steps of process 200 (and of other processes described herein) as being implemented by certain components of the processes, devices and systems of FIGS. 1-19, this is for purposes of illustration only. It should be understood that other components of the processes, devices and systems of FIGS. 1-19 may implement those steps instead.

In some embodiments, the steps on the right-hand side of FIG. 20 may be performed at least in part offline, e.g., prior to receiving a user query, and the steps on the left-hand side may be performed at least in part online, e.g., in real time once the user query is received at 2004, although in some embodiments, at least a portion of one or more of the steps on the right side may be performed online, and at least a portion of one or more of the steps on the left side may be performed offline.

At 2002, control circuitry (e.g., control circuitry 1704 of FIG. 17 and/or control circuitry 1811 of server 1804) may generate a pre-trained machine learning model (e.g., model 300 of FIG. 3 and/or knowledge graph 500 of FIGS. 5A-5B) to be configured to determine object types, e.g., a person, item, location or place, or animal, or other living creature (fantasy or real) or any suitable object, or any combination thereof.

At 2004, the control circuitry may determine a selected object type (e.g., in FIG. 1, may determine that selected object 118 corresponds to a character) using such pre-trained machine learning model generated at 2002. For example, a user query (e.g., at 102 of FIG. 1) may be received specifying such object. At 2006, the control circuitry may determine one or more same type of objects (e.g., images 303 and 305 of FIG. 3) in other frames (e.g., frames 116 and 108, other than frame 112 in which object 118 is selected) and extract images of such objects. For example, bounding shapes of objects in a particular media asset (e.g., 106 of FIG. 1) may be generated to find bounding shapes of other persons or characters across all frames, e.g. all key frames when scene image correlation is high (e.g., above a certain threshold). In some embodiments, all the objects detected in a frame may be used for subsequent steps.

At 2008, the control circuitry may iteratively compare the detected objects across frames against the selected object to find clearer images of the selected object, e.g., a k-nearest neighbor search-based approach and/or a metadata-based approach (see Appendix). In some embodiments, a certain number of frames, e.g., 60 frames (or any other suitable number of frames or other portions) before and/or after frame 112 of selected object 118, may be used to determine all objects, or objects of the same type. In some embodiments, such frames may be stored in a buffer to facilitate low latency analysis. In some embodiments, the control circuitry may detect objects across all the frames that comprise the video segment, e.g., using a video segmentation technique, and/or use a threshold logic in frames that may be scanned until a particular amount of certainty of the selected object's character identity is determined. In some embodiments, an online process can be utilized to perform semantic segmentation and object tracking for each frame of media asset 106 and create selectable map for each frame.

At 2010, the control circuitry may train a model (e.g., model 606 of FIG. 6) over exact identities of objects in a particular media asset (e.g., the television series "Game of Thrones" and/or "House of the Dragon"), to determine (at 2010) that a selected object (e.g., object 118) corresponds to a particular object (e.g., the character "Lord Caswell"). For example, each of an image of selected object 118 and images 303 and/or 305 may be input to model 606 of FIG. 6, e.g., matched images may be used as test sets to find the "exact" identity-character name of the selected object. At 2012, the control circuitry may perform video scene segmentation for objects of media asset 106, and at 2014 may determine the focus objects or most prominent one or more objects of a plurality of video scene segment (VSSs) of media asset 106, and generate one or more data structures, e.g., hash maps and data structures of FIGS. 7-15.

At 2016, the control circuitry may access all (or a subset of) the VSSs, and at 2017, the control circuitry may generate metadata for such VSSs (e.g., as shown in FIGS. 8-10, scene popularity, object popularity, scene type, actors, sound effects, music or any other suitable metadata or any combination thereof). At 2018, the control circuitry may generate and extract metadata for all watched scenes of media asset 106 for a user 134. For example, as shown in FIG. 8, such metadata may correspond to a user's reactions (e.g., high positive, low positive, neutral, or any other suitable reaction using a microphone and/or camera and/or other suitable sensor of user equipment 104 and/or second screen 610 or any other suitable device) to, and/or interactions with, a particular scene of media asset 106, e.g., whether and/or how many times a user re-watched a scene and/or skipped a scene and/or modified the volume for each VSS. At 2020, the control circuitry may determine VSSs of interest to the user based on the user's metadata. At 2022, the control circuitry may determine a contribution, for each of the scenes identified at 2020, of the scene's metadata, e.g., scene type, actor, or any other suitable criterion, or any combination thereof, using any suitable computer-implemented technique, e.g., a multivariate regression model that determines weights (importance) of each liked VSS and/or each VSS the user is deemed to be interested in, as shown in FIGS. 7-15.

At 2024, the control circuitry may rank each of the VSSs based on the processing performed at one or more of 2018, 2020 and 2022 (e.g., based at least in part on the weights determined at 2022), and at 2026, the control circuitry may select one or more of the highest ranked VSSs related to the selected object. At 2028, the control circuitry may determine whether the user has watched the one or more VSSs related to the object and determined at 2026; if so, processing may proceed to 2030, otherwise processing may proceed to 2032. At 2030, the control circuitry may generate for display one or more of the VSSs (or content related thereto) as supplemental content (e.g., supplemental content 138 of FIG. 1), e.g., the VSSs having the one or more highest scores. At 2032, the control circuitry may generate for display such content with a spoiler alert.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented system, comprising:
control circuitry configured to:
  generate for display a media asset; and
input/output (I/O) circuitry configured to:
  receive a query regarding an object depicted in the media asset at a first time point within a presentation duration of the media asset;
wherein the control circuitry is further configured to:
  identify supplemental content related to the object by:
    determining a presentation point within the presentation duration of the media asset related to the object;
    determining, based on a user profile of a user associated with the query, whether the presentation point was previously consumed by the user of the user profile; and based on determining that the presentation point was not previously consumed by the user of the user profile, refraining from using the presentation point as the supplemental content; and identifying other content to be used as the supplemental content; and generate for display the other content as the supplemental content while the media asset is being generated for display.

2. The system of claim 1, wherein the control circuitry is configured to determine an identity of the object in a context of the media asset by:

identifying a plurality of portions of the media asset that are related to the object depicted at the first time point of the media asset and associated with the query; and using one or more attributes of the plurality of portions of the media asset to determine the identity of the object in the context of the media asset.

3. The system of claim 2, wherein the control circuitry is configured to determine the identity of the object in the context of the media asset by:

determining a type of the object depicted at the first time point of the media asset and associated with the query, wherein the plurality of portions of the media asset that are related to the object are identified based on depicting one or more objects of the same type as the object;

comparing the object associated with the query to the one or more objects depicted in the plurality of portions of the media asset;

determining, based on the comparing, one or more matching objects in the plurality of portions that match the object depicted at the first time point of the media asset and associated with the query; and using the one or more matching objects to determine the identity of the object in the context of the media asset.

4. The system of claim 2, wherein the control circuitry is further configured to:

train a machine learning model to receive as input an attribute related to a particular object depicted in the media asset and output an indication of an identity of the particular object in the context of the media asset;

input, to the trained machine learning model, a particular attribute related to the object and one or more attributes related to the plurality of portions of the media asset, wherein the one or more attributes are different than the particular attribute of the object; and determine an output of the trained machine learning model indicating the identity of the object in the context of the media asset.

5. The system of claim 2, wherein the control circuitry is further configured to:

generate a knowledge graph comprising a plurality of nodes, the plurality of nodes comprising a first node corresponding to a particular attribute related to the object and one or more other nodes corresponding to one or more attributes related to the plurality of portions of the media asset; and use the knowledge graph to determine the identity of the object in the context of the media asset.

6. The system of claim 1, wherein:

the media asset is an episodic media asset comprising a plurality of episodes of a series;

the first time point occurs during a first episode of the plurality of episodes; and the presentation point occurs during a second episode of the plurality of episodes that is earlier in the series than the first episode or later in the series than the first episode.

7. The system of claim 1, wherein:

the media asset comprises a plurality of related media assets;

the first time point occurs during a first related media asset of the plurality of related media assets; and the presentation point occurs during a second related media asset corresponding to a prequel of, or a sequel to, the first related media asset.

8. The system of claim 1, wherein the other content and the media asset are displayed simultaneously on a same device.

9. The system of claim 1, wherein the other content and the media asset are displayed simultaneously on different devices.

10. The system of claim 1, wherein the control circuitry is configured to identify the other content to be used as the supplemental content by:

obtaining the other content from an external source that is distinct from within the presentation duration of the media asset, based on determining that the presentation point was not previously consumed by the user of the user profile.

11. A computer-implemented method, comprising:

generating for display a media asset;

receiving a query regarding an object depicted in the media asset at a first time point within a presentation duration of the media asset;

identifying supplemental content related to the object by:

determining a presentation point within the presentation duration of the media asset related to the object;

determining, based on a user profile of a user associated with the query, whether the presentation point was previously consumed by the user of the user profile; and based on determining that the presentation point was not previously consumed by the user of the user profile, refraining from using the presentation point as the supplemental content; and identifying other content to be used as the supplemental content; and generating for display the other content as the supplemental content while the media asset is being generated for display.

12. The method of claim 11, further comprising determining an identity of the object in a context of the media asset by:

identifying a plurality of portions of the media asset that are related to the object depicted at the first time point of the media asset and associated with the query; and using one or more attributes of the plurality of portions of the media asset to determine the identity of the object in the context of the media asset.

13. The method of claim 12, wherein determining the identity of the object in the context of the media asset further comprises:

determining a type of the object depicted at the first time point of the media asset and associated with the query, wherein the plurality of portions of the media asset that are related to the object are identified based on depicting one or more objects of the same type as the object;

comparing the object associated with the query to the one or more objects depicted in the plurality of portions of the media asset;

determining, based on the comparing, one or more matching objects in the plurality of portions that match the object depicted at the first time point of the media asset and associated with the query; and using the one or more matching objects to determine the identity of the object in the context of the media asset.

14. The method of claim 12, further comprising:

training a machine learning model to receive as input an attribute related to a particular object depicted in the media asset and output an indication of an identity of the particular object in the context of the media asset;

inputting, to the trained machine learning model, a particular attribute related to the object and one or more attributes related to the plurality of portions of the media asset, wherein the one or more attributes are different than the particular attribute of the object; and determining an output of the trained machine learning model indicating the identity of the object in the context of the media asset.

15. The method of claim 12, further comprising:

generating a knowledge graph comprising a plurality of nodes, the plurality of nodes comprising a first node corresponding to a particular attribute related to the object and one or more other nodes corresponding to one or more attributes related to the plurality of portions of the media asset; and using the knowledge graph to determine the identity of the object in the context of the media asset.

16. The method of claim 11, wherein:

the media asset is an episodic media asset comprising a plurality of episodes of a series;

the first time point occurs during a first episode of the plurality of episodes; and the presentation point occurs during a second episode of the plurality of episodes that is earlier in the series than the first episode or later in the series than the first episode.

17. The method of claim 11, wherein:

the media asset comprises a plurality of related media assets;

the first time point occurs during a first related media asset of the plurality of related media assets; and the presentation point occurs during a second related media asset corresponding to a prequel of, or a sequel to, the first related media asset.

18. The method of claim 11, wherein identifying the other content to be used as the supplemental content comprises:

obtaining the other content from an external source that is distinct from within the presentation duration of the media asset, based on determining that the presentation point was not previously consumed by the user of the user profile.

19. The method of claim 11, wherein the other content and the media asset are displayed simultaneously on a same device.

20. The method of claim 11, wherein the other content and the media asset are displayed simultaneously on different devices.

* * * * *